(12) United States Patent
Aoyama et al.

(10) Patent No.: US 11,851,282 B2
(45) Date of Patent: Dec. 26, 2023

(54) CONVEYING DEVICE, SAMPLE ANALYSIS SYSTEM AND SAMPLE PRETREATMENT DEVICE INCLUDING THE CONVEYING DEVICE, AND METHOD FOR CONVEYING CONVEYANCE OBJECT

(71) Applicant: Hitachi High-Tech Corporation, Tokyo (JP)

(72) Inventors: Yasuaki Aoyama, Tokyo (JP); Ryosuke Hoshi, Tokyo (JP); Hiroyuki Kobayashi, Tokyo (JP); Satoru Kaneko, Tokyo (JP); Takeshi Tamakoshi, Tokyo (JP); Hiroshi Watanabe, Tokyo (JP); Katsuhiro Kambara, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 306 days.

(21) Appl. No.: 17/434,945

(22) PCT Filed: Jan. 14, 2020

(86) PCT No.: PCT/JP2020/000907
§ 371 (c)(1),
(2) Date: Aug. 30, 2021

(87) PCT Pub. No.: WO2020/183890
PCT Pub. Date: Sep. 17, 2020

(65) Prior Publication Data
US 2022/0144556 A1    May 12, 2022

(30) Foreign Application Priority Data
Mar. 8, 2019 (JP) .................................. 2019-042233

(51) Int. Cl.
*B65G 43/00* (2006.01)
*B65G 23/00* (2006.01)
(Continued)

(52) U.S. Cl.
CPC .............. *B65G 43/00* (2013.01); *B65G 23/00* (2013.01); *B65G 54/02* (2013.01); *H02P 29/00* (2013.01);
(Continued)

(58) Field of Classification Search
CPC ......... H02P 29/00; B65G 43/00; B65G 23/00; B65G 2203/0258; B65G 2201/0261; B65G 54/02; G01N 35/026; G01N 35/00584
(Continued)

(56) References Cited

U.S. PATENT DOCUMENTS 5,163,546 A * 11/1992 Kawada ............... H02K 41/025
                                                         104/282
10,989,725 B2 * 4/2021 Ren ........................ B65G 54/02
(Continued)

FOREIGN PATENT DOCUMENTS

CN        106483313 A  *  3/2017  ............. G01N 35/04
EP           3016116    *  5/2016  ............... H01F 5/04
(Continued)

OTHER PUBLICATIONS

International Search Report (PCT/ISA/210) issued in PCT Application No. PCT/JP2020/000907 dated Mar. 10, 2020 with English translation (five (5) pages).
(Continued)

*Primary Examiner* — James R Bidwell
(74) *Attorney, Agent, or Firm* — Crowell & Moring LLP

(57) ABSTRACT

The invention provides a conveying device having a conveying performance higher than that of the related art, a
(Continued)

sample analysis system and sample pretreatment device with the conveying device and a method for conveying a conveyance object. A conveying device 1 includes a permanent magnet 10 which is provided on a sample rack 111 side, magnetic poles 25 each of which includes a core 22 made of a second magnetic body and a winding 21 wound around an outer periphery of the core 22, drive circuits 50 each of which supplies a current to the winding 21 of the magnetic pole 25, and current command calculation units 55 each of which controls a value of the current to be supplied to the winding 21 from the drive circuit 50. The current command calculation unit 55 makes the currents to be supplied to the windings 21 vary.

12 Claims, 24 Drawing Sheets

(51) Int. Cl.
*H02P 29/00* (2016.01)
*B65G 54/02* (2006.01)
*G01N 35/02* (2006.01)

(52) U.S. Cl.
CPC .... *B65G 2203/0258* (2013.01); *G01N 35/026* (2013.01)

(58) Field of Classification Search
USPC .................................. 198/619, 805
See application file for complete search history.

(56) References Cited

U.S. PATENT DOCUMENTS

| | | | | |
|---|---|---|---|---|
| 2016/0069715 A1* | 3/2016 | Sinz | ........................ | G01N 35/00 324/202 |
| 2016/0097786 A1* | 4/2016 | Malinowski | ........... | G01N 35/00 422/67 |
| 2017/0059599 A1 | 3/2017 | Riether | | |
| 2018/0217174 A1* | 8/2018 | Malinowski | ....... | G01R 19/2513 |
| 2023/0097926 A1* | 3/2023 | Hauer | .................... | B65G 54/02 198/619 |

FOREIGN PATENT DOCUMENTS

| | | | | |
|---|---|---|---|---|
| EP | 3382397 | * | 10/2018 | ............. G01N 35/02 |
| JP | 61-217434 A | | 9/1986 | |
| JP | 5-199616 A | | 8/1993 | |
| JP | 7-288967 A | | 10/1995 | |
| JP | 2000-92628 A | | 3/2000 | |
| JP | 2017-53850 A | | 3/2017 | |
| JP | 2017-77971 A | | 4/2017 | |
| JP | 2017-227648 A | | 12/2017 | |
| WO | WO 2013/064662 A1 | | 5/2013 | |
| WO | WO 2013/064665 A1 | | 5/2013 | |

OTHER PUBLICATIONS

Japanese-language Written Opinion (PCT/ISA/237) issued in PCT Application No. PCT/JP2020/000907 dated Mar. 10, 2020 (five (5) pages).
International Preliminary Report on Patentability (PCT/IB/338 & PCT/EPEA/409) issued in PCT Application No. PCT/JP2020/000907 dated Sep. 10, 2021 (seven (7) pages).

* cited by examiner

[FIG. 1]
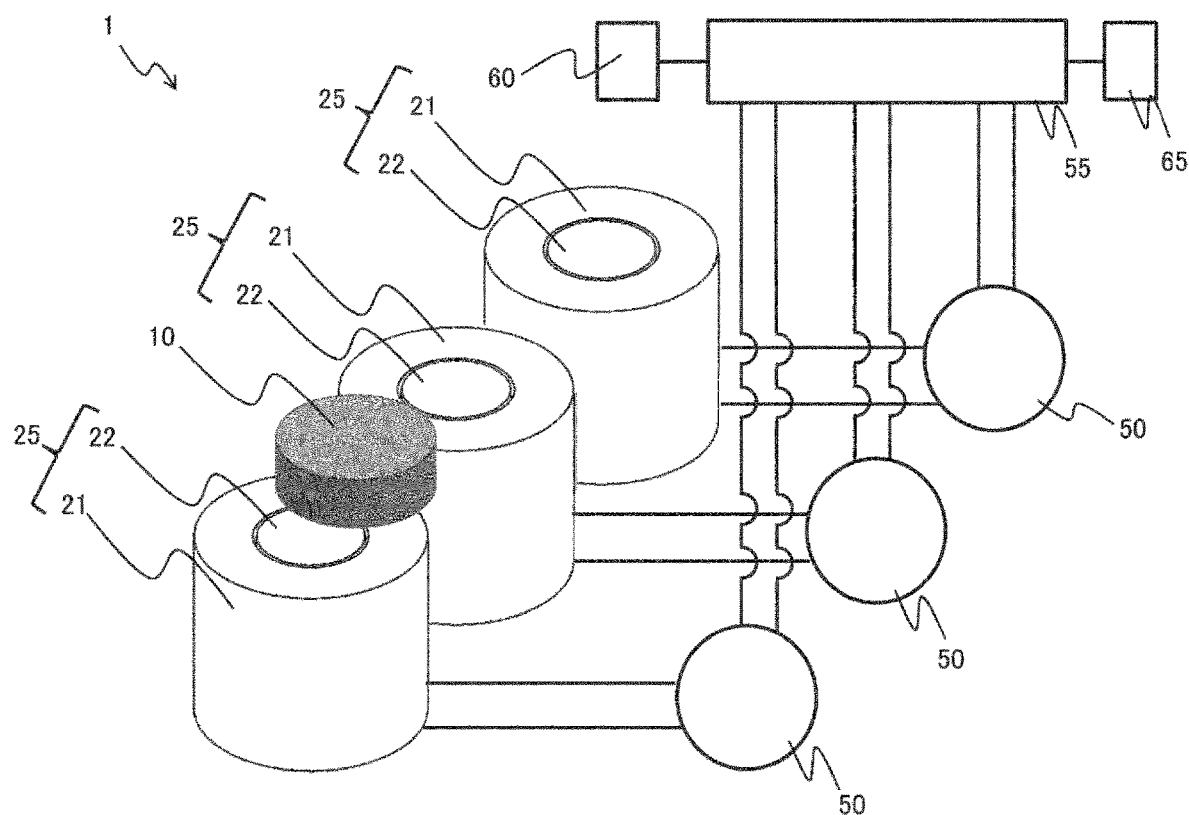

[FIG. 2]
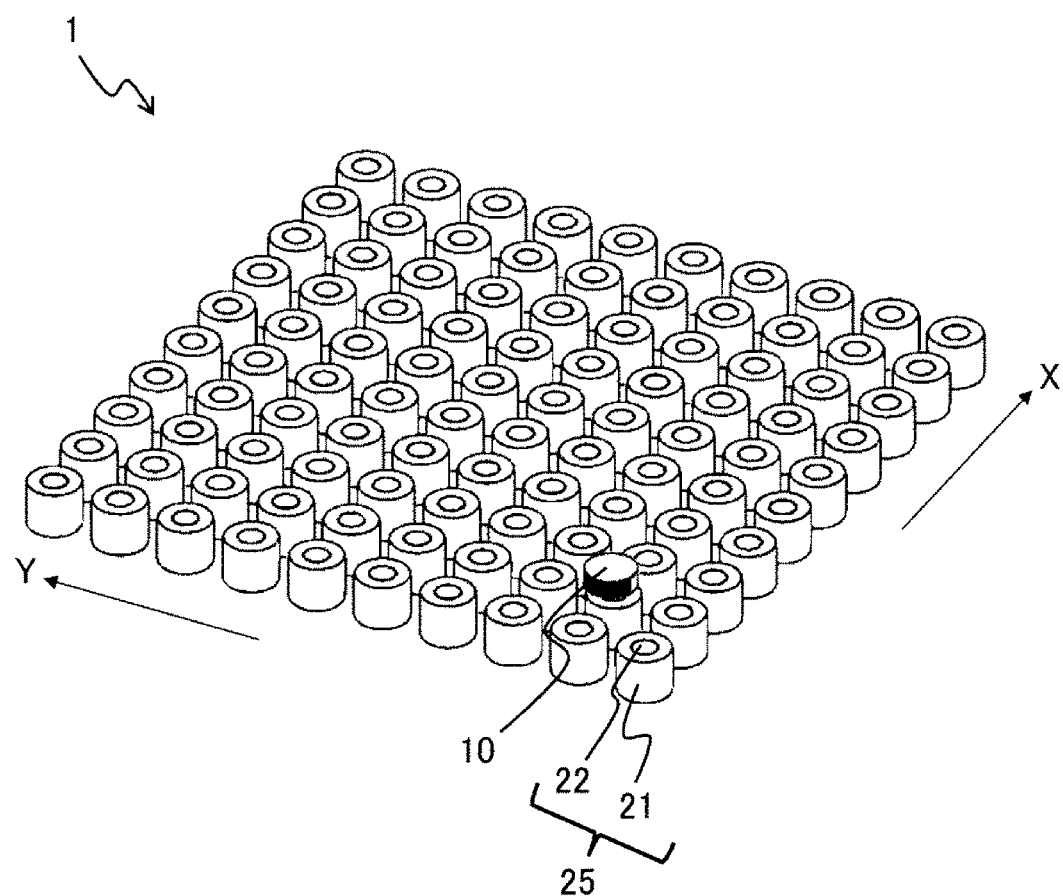

[FIG. 3]
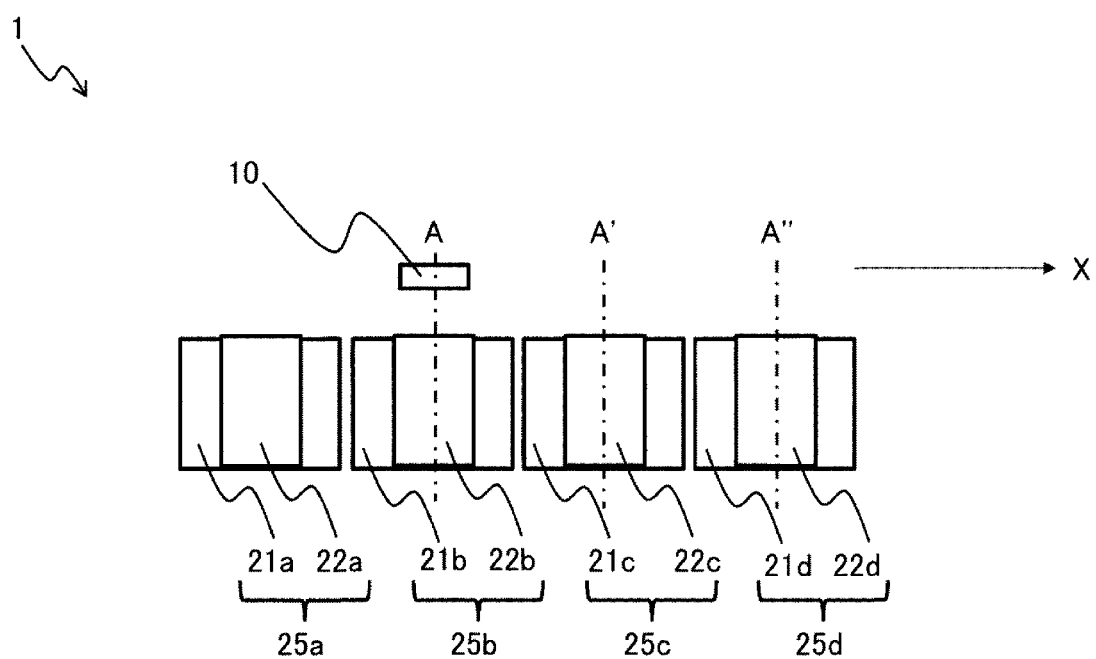

[FIG. 4]
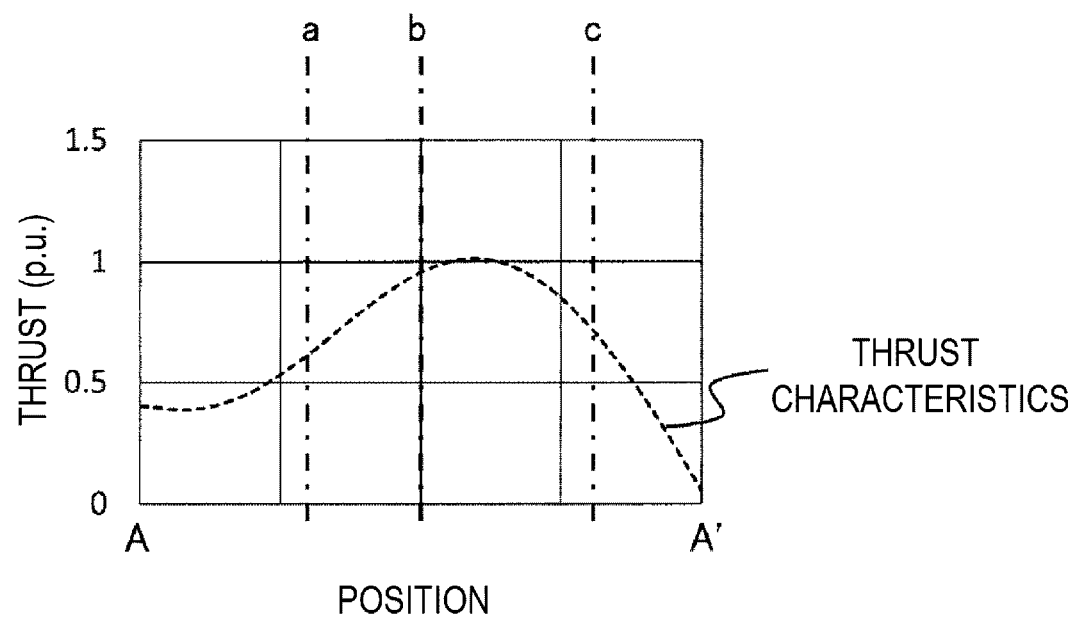

[FIG. 5]
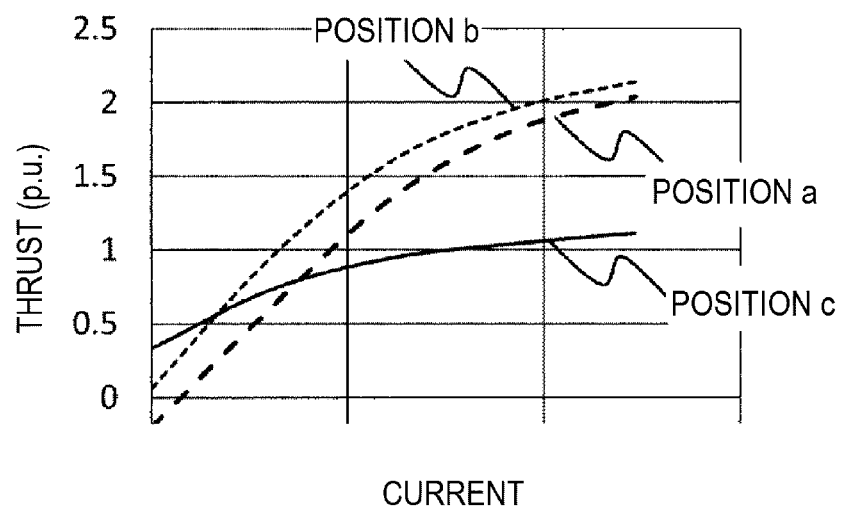

[FIG. 6]
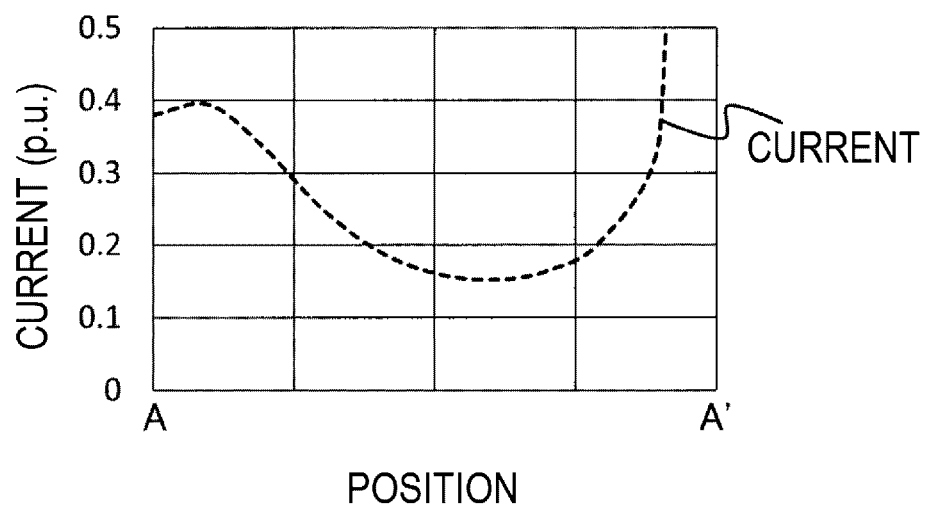

[FIG. 7]
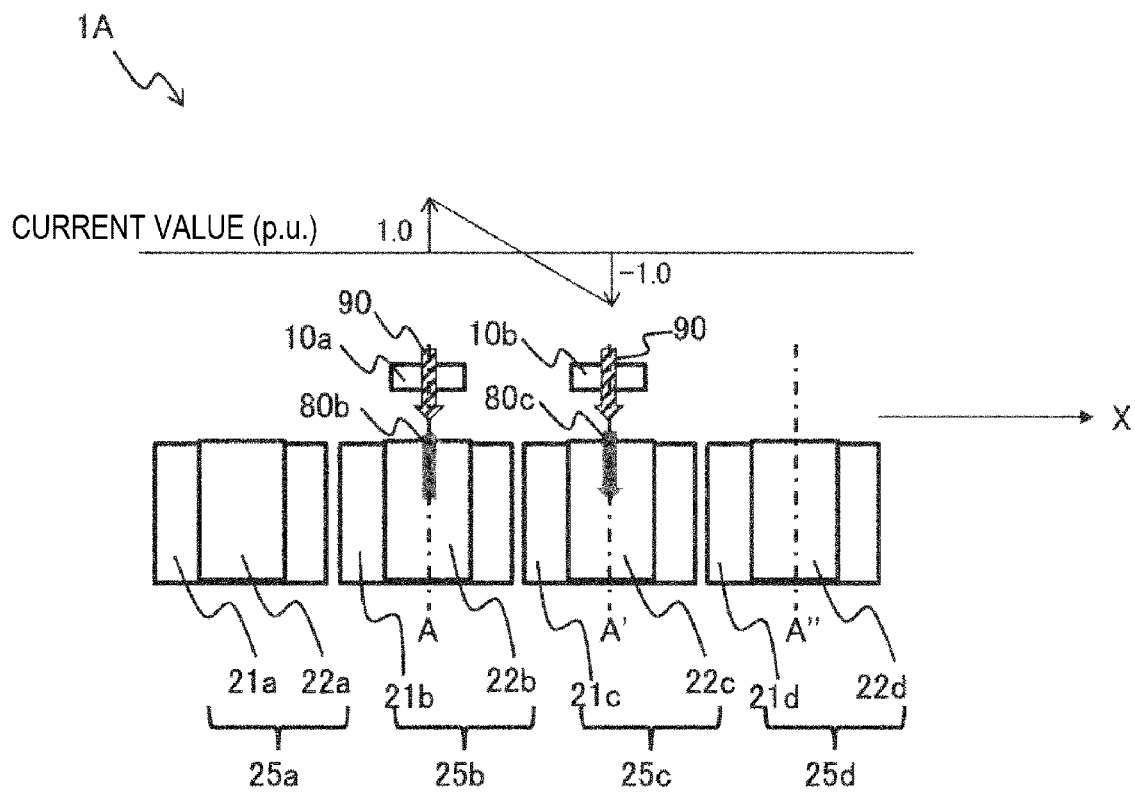

[FIG. 8]
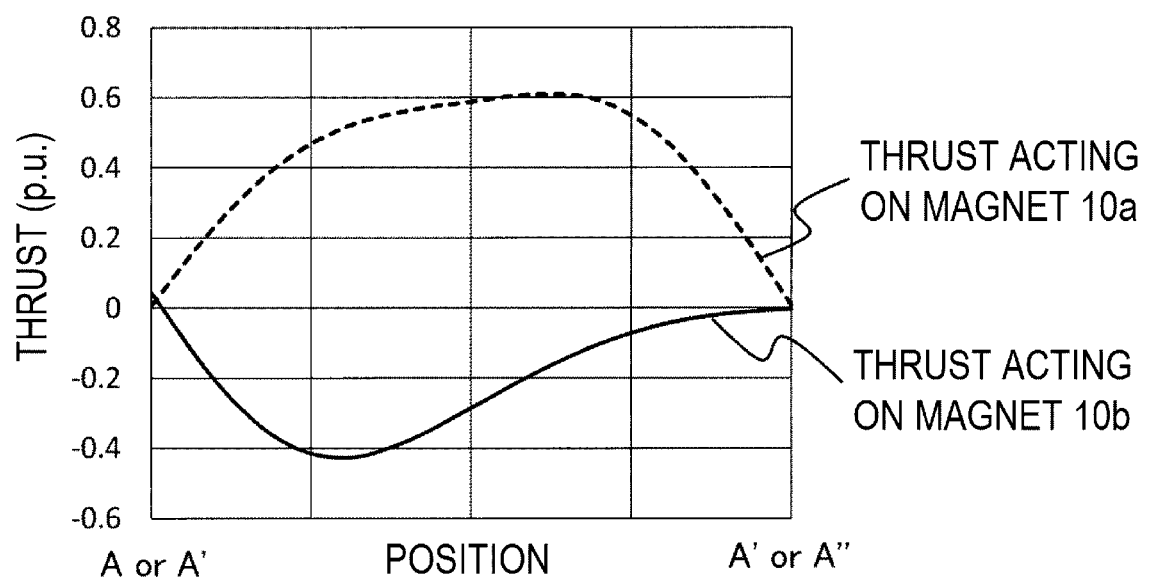

[FIG. 9]
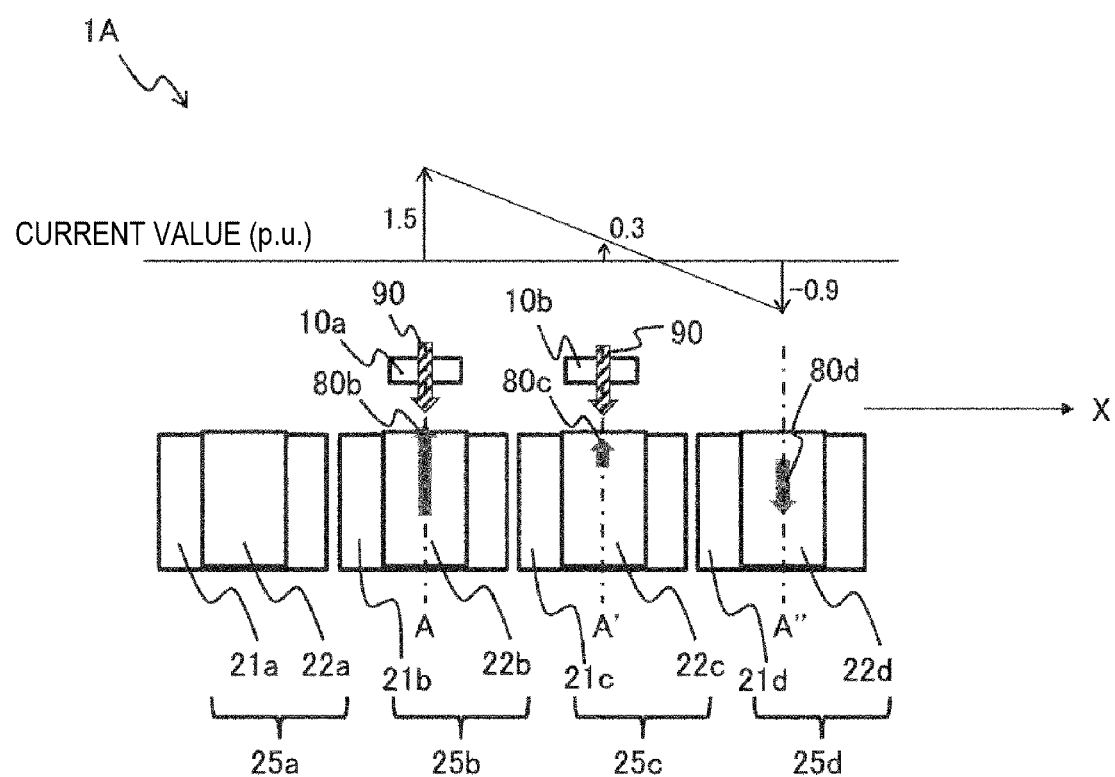

[FIG. 10]
POSITION AND THRUST CHARACTERISTICS
(ARBITRARY CURRENT)
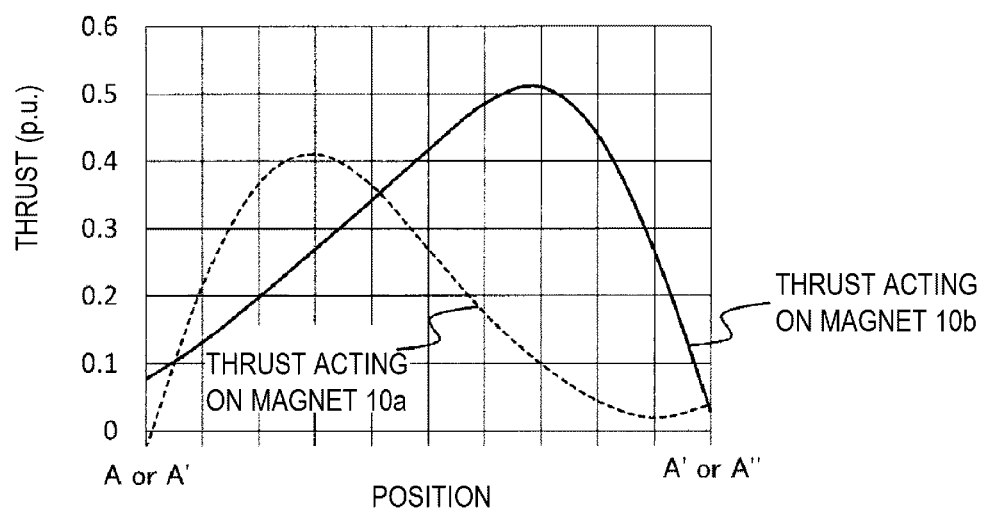

[FIG. 11]
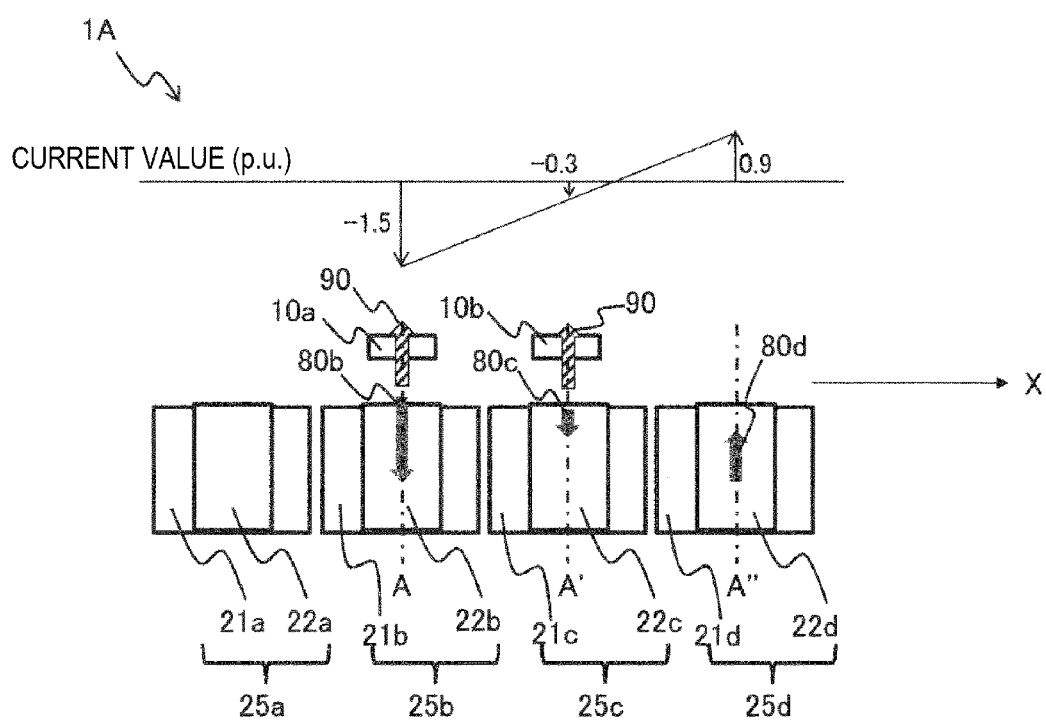

[FIG. 12]
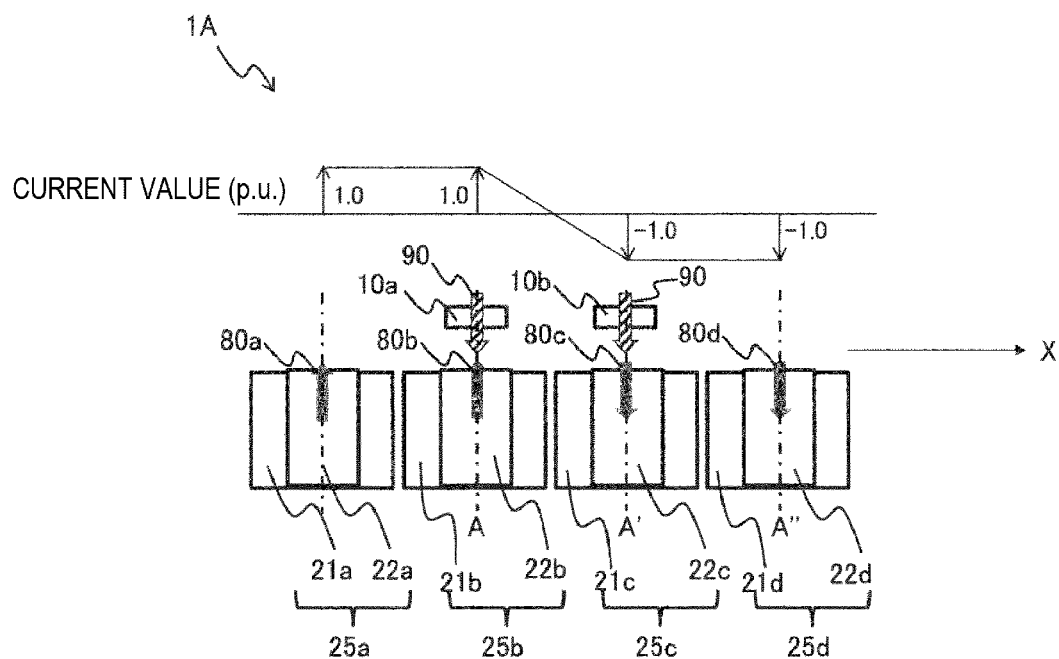

[FIG. 13]
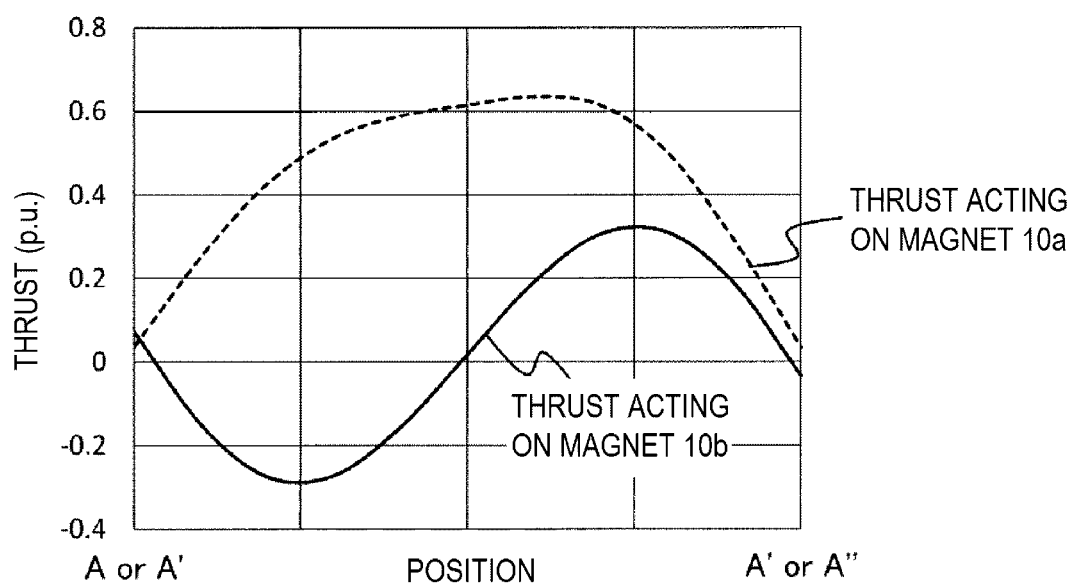

[FIG. 14]
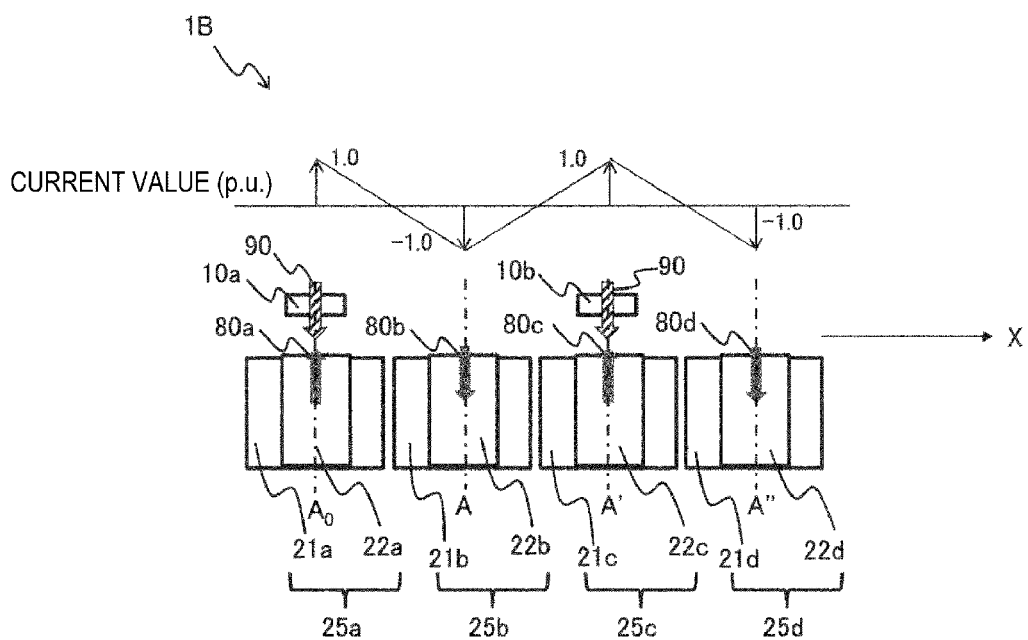

[FIG. 15]
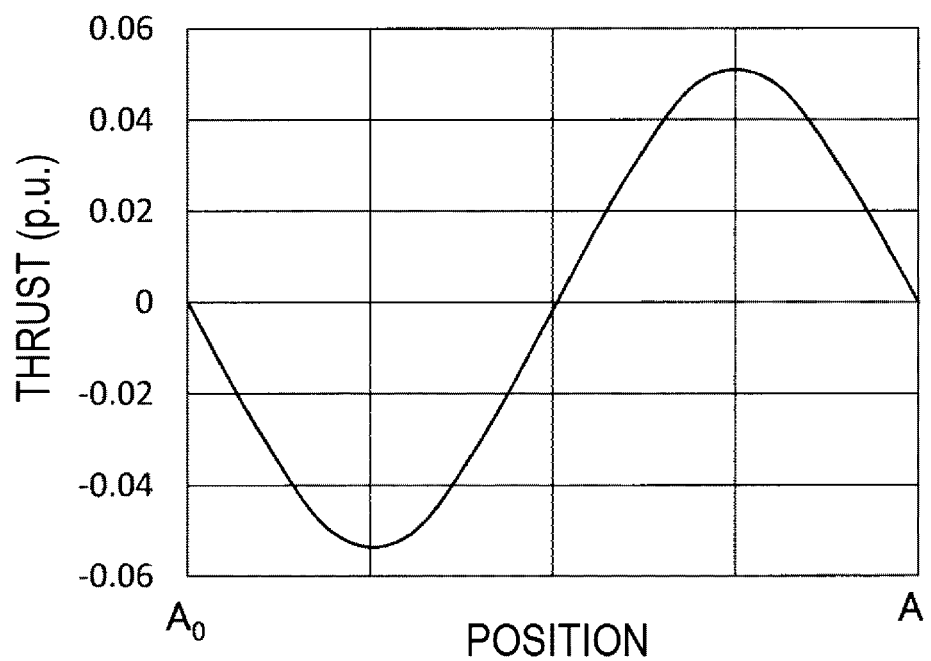

[FIG. 16]
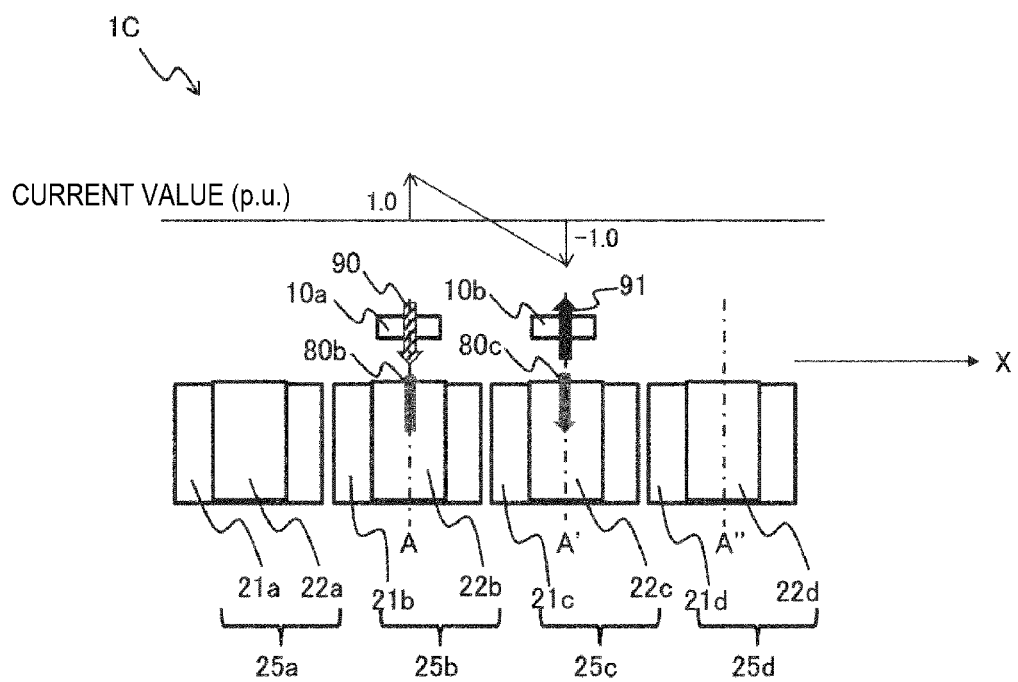

[FIG. 17]
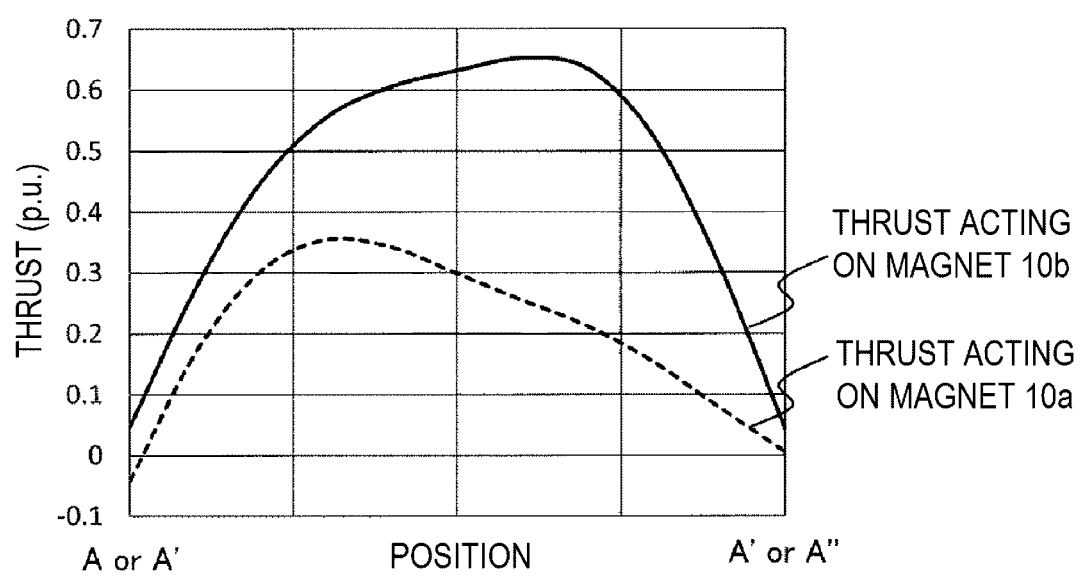

[FIG. 18]
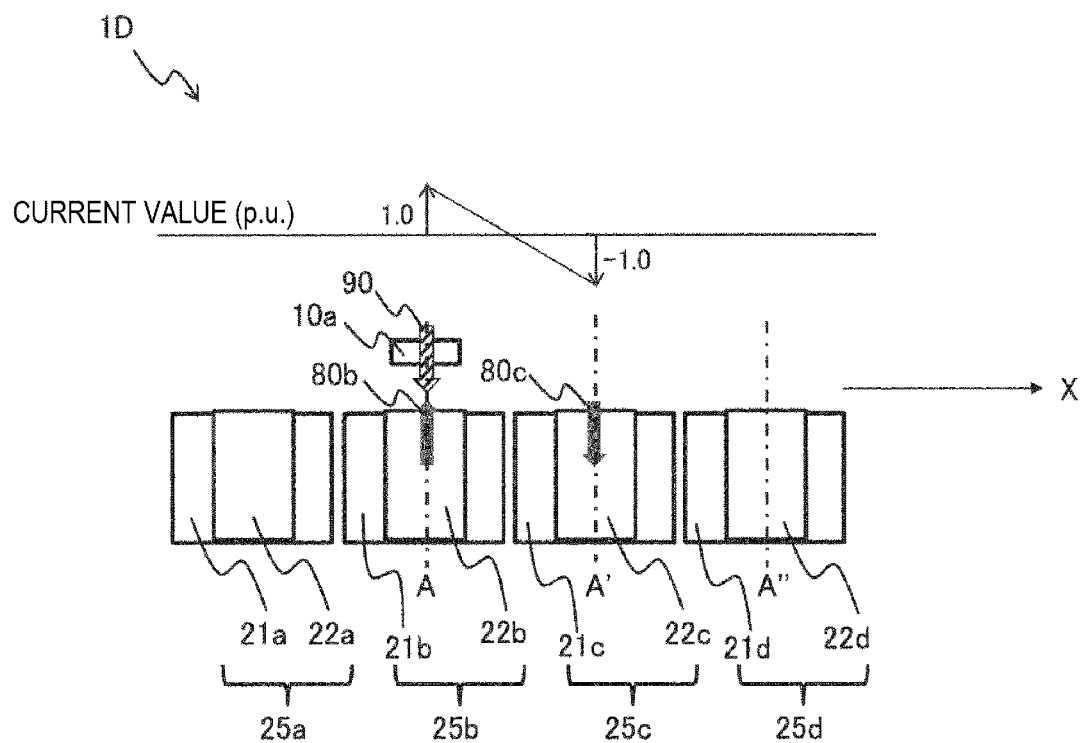

[FIG. 19]
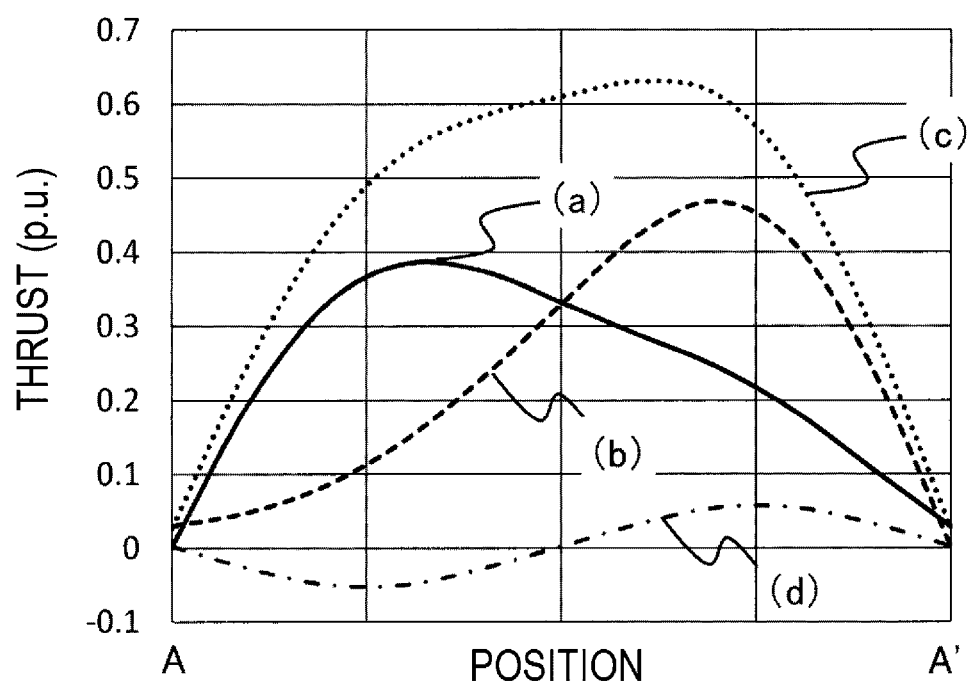

[FIG. 20]
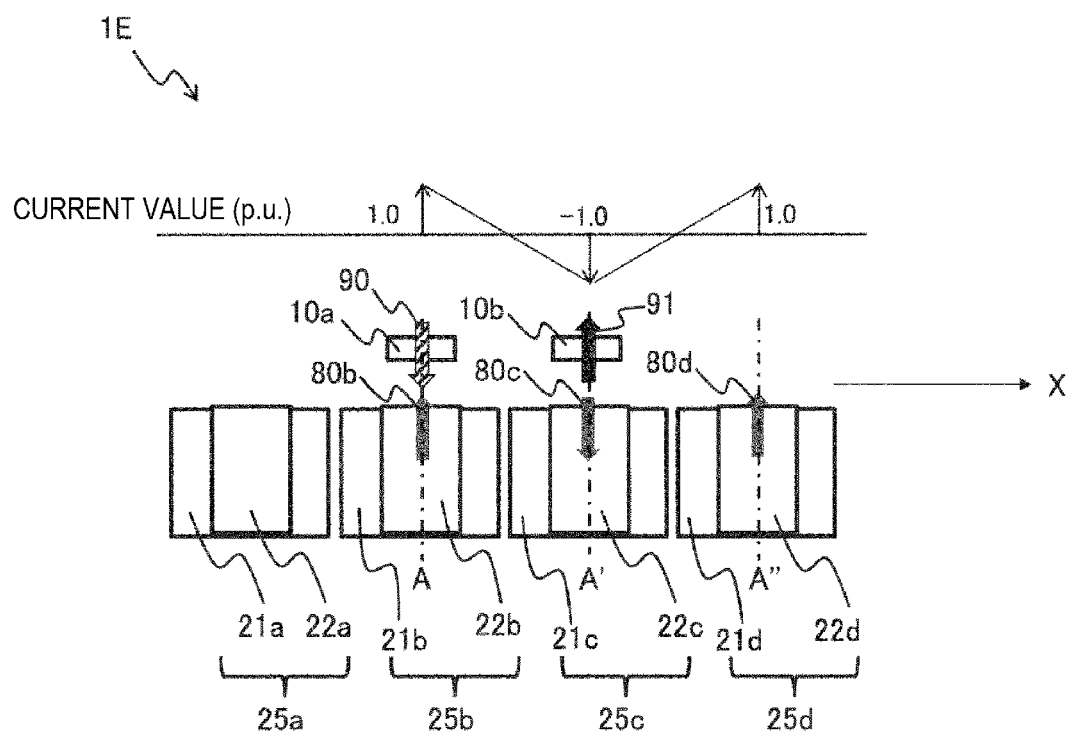

[FIG. 21]
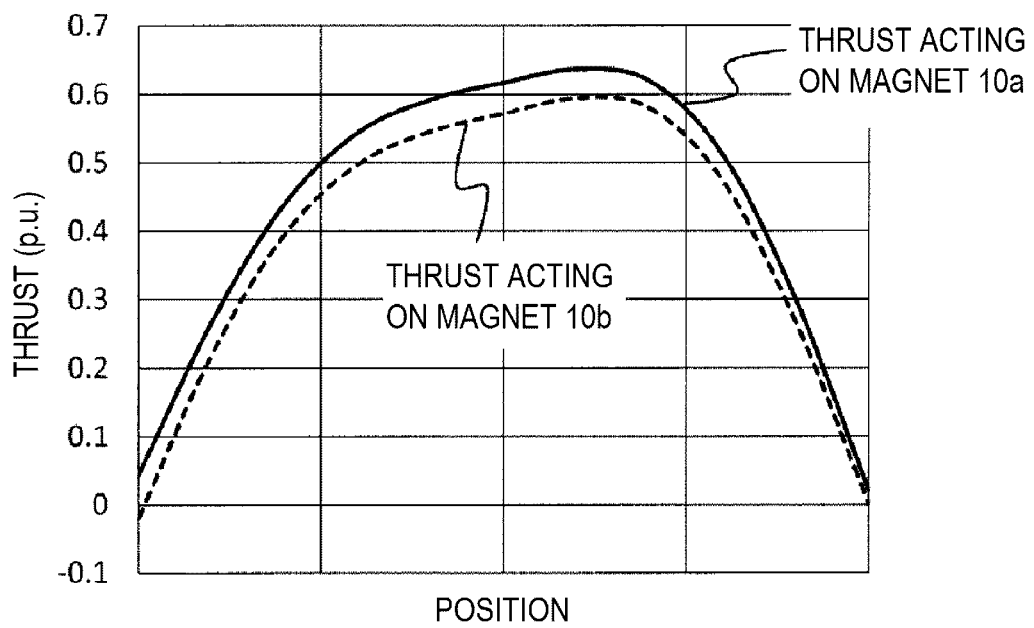

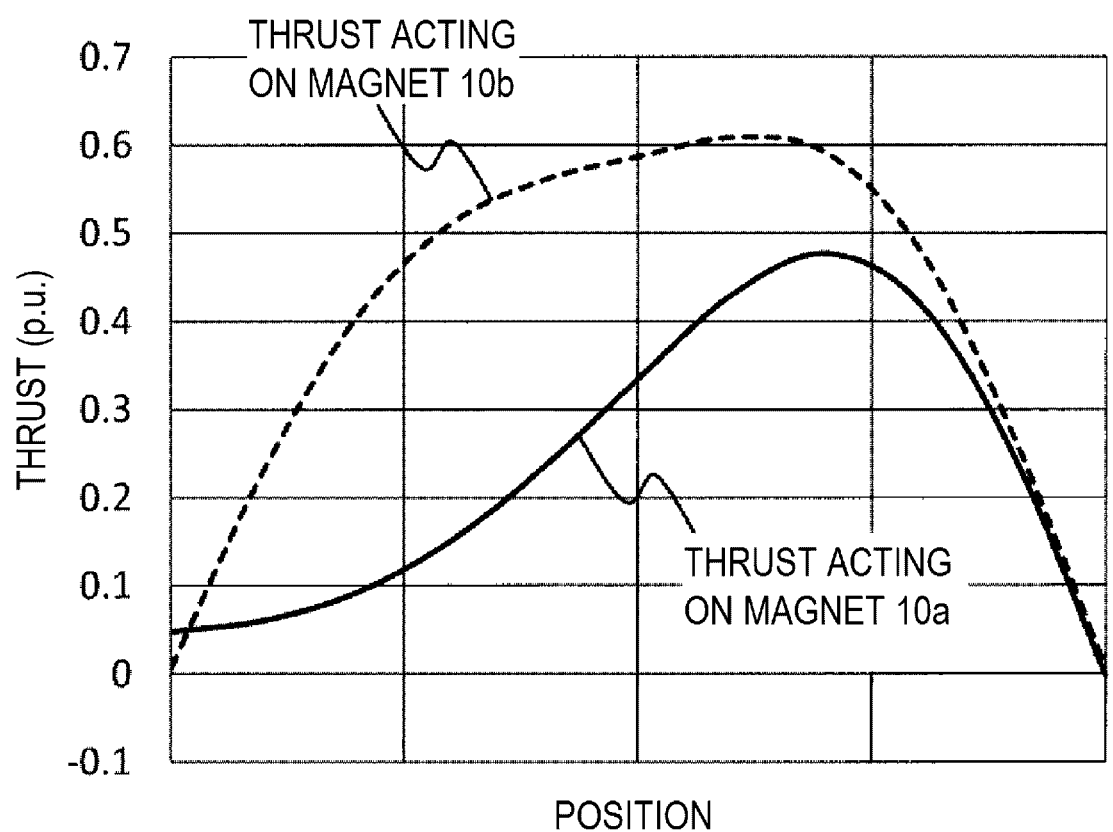
[FIG. 22]

[FIG. 23]
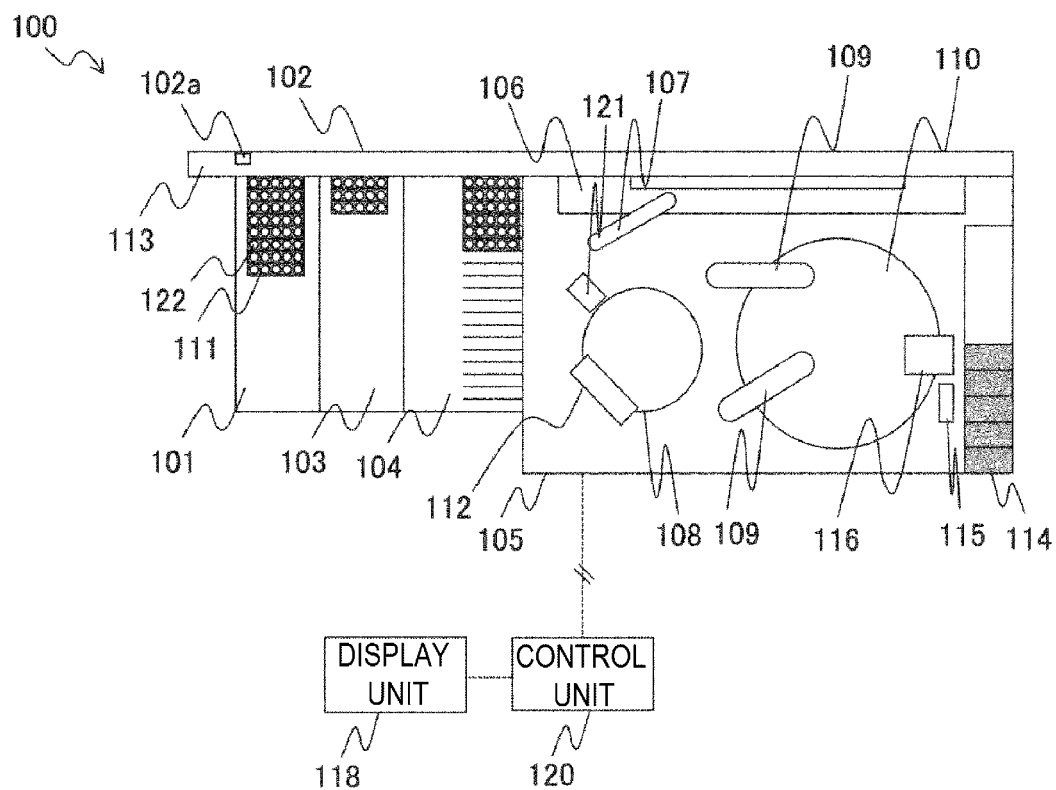

[FIG. 24]
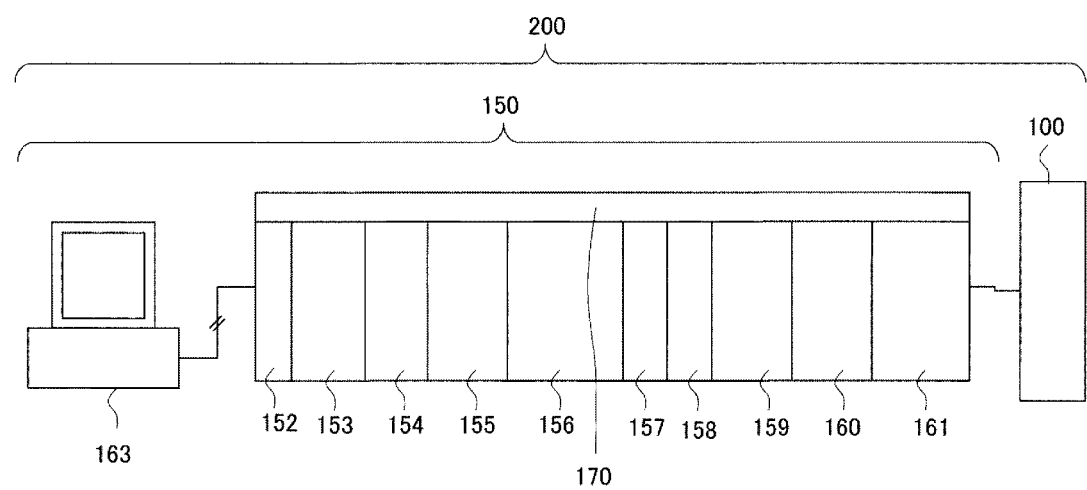

CONVEYING DEVICE, SAMPLE ANALYSIS SYSTEM AND SAMPLE PRETREATMENT DEVICE INCLUDING THE CONVEYING DEVICE, AND METHOD FOR CONVEYING CONVEYANCE OBJECT

TECHNICAL FIELD

The present invention relates to a conveying device suitable for a sample analysis system that performs analysis of a biological sample such as, for example, blood, urine, or the like (hereinafter referred to as a sample) and a sample pretreatment device that performs pretreatment necessary for the analysis thereof, the sample analysis system and the sample pretreatment device including the conveying device, and a method for conveying a conveyance object.

BACKGROUND ART

As an example of a laboratory sample conveying system and a corresponding operation method that are significantly flexible and provide a high conveying performance, JP-A-2017-77971 (PTL 1) discloses that the example thereof includes: a plurality of container carriers respectively including at least one magnetically active device, desirably at least one permanent magnet and adapted to convey a sample container; a conveying surface adapted to convey the container carrier; and a plurality of electromagnetic actuators that are stationary and disposed below the conveying surface and that are adapted to move the container carrier on the conveying surface by applying a magnetic force to the container carrier.

As an example of a laboratory sample conveying system, a laboratory system, and an operating method that are flexible and provide a high conveying performance, JP-A-2017-227648 (PTL 2) discloses that the example thereof includes: a plurality of container carriers each of which including at least one magnetically active device, desirably at least one permanent magnet and being adapted to carry a sample container including a sample; a conveying surface adapted to convey the plurality of container carriers; a plurality of electromagnetic actuators that are stationary and disposed below the conveying surface and that are adapted to move the container carrier on the conveying surface by applying a magnetic force to the container carrier; and at least one conveying device disposed to convey the sample between the conveying surface and laboratory stations, desirably a pre-analysis station, an analysis station, and/or a post-analysis station.

CITATION LIST

Patent Literature

PTL 1: JP-A-2017-77971
PTL 2: JP-A-2017-227648

SUMMARY OF INVENTION

Technical Problem

A sample analysis system for a clinical test performs a test of an instructed analysis item with respect to samples such as blood, plasma, serum, urine, other body fluids, or the like.

In the sample analysis system, devices having a plurality of functions can be connected to each other and each process can be automatically processed. That is, in order to streamline laboratory work, an analysis unit of a plurality of analytical fields such as biochemistry, immunity, or the like and a pretreatment unit that performs pretreatment necessary for analysis are connected to a conveying line, thereby being operated as one system.

The conveying line used in the sample analysis system of related art is mainly a belt drive system. In the belt drive system, there is a problem that when conveyance is stopped due to some abnormality during the conveyance, the sample cannot be supplied to a device on a downstream side. Therefore, it is required to pay close attention to wear of a belt.

With advancement of medical care and progress of aging society, importance of sample treatment increases. Therefore, in order to improve analysis processing capability of the sample analysis system, it is desired to achieve high-speed conveyance of the sample, mass simultaneous conveyance thereof, and conveyance thereof in a plurality of directions.

As an example of a technology for implementing the above-described conveyance, there are technologies described in JP-A-2017-77971 and JP-A-2017-227648 (PTLs 1 and 2).

In the technologies described in JP-A-2017-77971 and JP-A-2017-227648 (PTLs 1 and 2), a container carrier detection device for detecting a position of a magnetically active device provided on a sample conveying carrier is provided.

JP-A-2017-77971 and JP-A-2017-227648 (PTLs 1 and 2) only describe switching the electromagnetic actuator to be activated according to a position of the container carrier.

In the above-described technologies, there is a problem that a thrust generated in the electromagnetic actuator is different depending on the position of the container carrier, thereby causing problems that a speed of the container carrier is not stable, and vibration of the container carrier occurs during the conveyance.

It is conceivable that a weight of the container carrier is different depending on a type of the sample and presence or absence thereof, or a conveying speed of the container carrier decreases when an increase in friction and a decrease in thrust occur due to deterioration in a conveying surface and a decrease in magnetic force, or the speed varies depending on a state of the container carrier, such that there are problems that the conveying speed of the container carrier varies and a conveying performance deteriorates.

The present invention provides a conveying device having a conveying performance higher than that of related art, a sample analysis system and a sample pretreatment device including the conveying device, and a method for conveying a conveyance object.

Solution to Problem

The present invention includes a plurality of units for solving the above-described problems, and an example thereof includes: a first magnetic body which is provided on a side of a conveyance object; two or more magnetic circuits which each include a core made of a second magnetic body and a winding wound on an outer periphery of the core; a drive circuit which supplies a current to the winding of the magnetic circuit; a calculation unit which controls a value of the current to be supplied from the drive circuit to the winding; and a conveyance object detection unit which detects a position or speed of the first magnetic body, in which the calculation unit makes the values of currents to be supplied to the respective windings adjacent to each other along a traveling direction of the conveyance object, different from each other in positive and negative, makes the current to be supplied to the winding vary based on information on the position or speed of the first magnetic body which is detected by the conveyance object detection unit, and makes, when a pitch of two or more of the cores is set to Pc, a current value in a ½ Pc section larger than a current value after ½ Pc.

Advantageous Effects of Invention

According to the present invention, it is possible to provide a conveying device having a conveying performance higher than that of related art. An issue, a configuration, and an effect other than those described above will be clarified by descriptions of the following embodiments.

BRIEF DESCRIPTION OF DRAWINGS

FIG. 1 is a diagram showing a schematic configuration of a driving-side of a conveying device according to a first embodiment.

FIG. 2 is a diagram showing a schematic configuration of the conveying device according to the first embodiment of the invention.

FIG. 3 is a cross-sectional view schematically showing a state where a permanent magnet is conveyed by the conveying device according to the first embodiment.

FIG. 4 is a graph showing a magnitude of a thrust which acts on the permanent magnet from a coil in a certain position when the permanent magnet is conveyed by the conveying device according to the first embodiment.

FIG. 5 is a graph showing a relationship between a position of the coil and a magnitude of the thrust which acts on the permanent magnet when the permanent magnet is conveyed by the conveying device according to the first embodiment.

FIG. 6 is a graph showing an example of a current for making a constant magnitude of the thrust which acts on the permanent magnet when the permanent magnet is conveyed by the conveying device according to the first embodiment.

FIG. 7 is a cross-sectional view schematically showing a relationship between a magnitude of a current value and thrusts which act on permanent magnets when the permanent magnets are conveyed in a conveying device according to a second embodiment of the invention.

FIG. 8 is a graph showing magnitudes of the thrusts which act on the respective permanent magnets from coils in certain positions when the permanent magnets are conveyed under a condition shown in FIG. 7.

FIG. 9 is a cross-sectional view schematically showing a relationship between a magnitude of a current value and thrusts which act on the respective permanent magnets when the permanent magnets are conveyed in the conveying device according to the second embodiment.

FIG. 10 is a graph showing magnitudes of the thrusts which act on the respective permanent magnets from coils in certain positions when the permanent magnets are conveyed under a condition shown in FIG. 9.

FIG. 11 is a cross-sectional view schematically showing another example of the relationship between the magnitude of the current value and the thrusts which act on the respective permanent magnets when the permanent magnets are conveyed in the conveying device according to the second embodiment.

FIG. 12 is a cross-sectional view schematically showing the relationship between the magnitude of the current value and the thrusts which act on the respective permanent magnets when the permanent magnets are conveyed, as a comparison in the conveying device according to the second embodiment.

FIG. 13 is a graph showing magnitudes of the thrusts which act on the respective permanent magnets from the coils in certain positions when the permanent magnets are conveyed under a condition shown in FIG. 12.

FIG. 14 is a cross-sectional view schematically showing a relationship between a magnitude of a current value and thrusts which act on permanent magnets when the permanent magnets are conveyed in a conveying device according to a third embodiment of the invention.

FIG. 15 is a graph showing a magnitude of a thrust which acts on a permanent magnet from a coil in a certain position when the permanent magnet is conveyed under a condition shown in FIG. 14.

FIG. 16 is a cross-sectional view schematically showing a relationship between a magnitude of a current value and thrusts which act on permanent magnets when the permanent magnets are conveyed in a conveying device according to a fourth embodiment of the invention.

FIG. 17 is a graph showing magnitudes of the thrusts which act on the respective permanent magnets from coils in certain positions when the permanent magnets are conveyed under a condition shown in FIG. 16.

FIG. 18 is a cross-sectional view schematically showing a relationship between a magnitude of a current value and a thrust which acts on a permanent magnet when the permanent magnet is conveyed in a conveying device according to a fifth embodiment of the invention.

FIG. 19 is a graph showing magnitudes of the thrust which acts on the permanent magnet from coils in certain positions when the permanent magnet is conveyed under a condition shown in FIG. 18.

FIG. 20 is a cross-sectional view schematically showing a relationship between a magnitude of a current value and thrusts which act on permanent magnets when the permanent magnets are conveyed in a conveying device according to a sixth embodiment of the invention.

FIG. 21 is a graph showing magnitudes of the thrusts which act on the respective permanent magnets from coils in certain positions when the permanent magnets are conveyed under a condition shown in FIG. 20.

FIG. 22 is a graph showing the magnitudes of the thrusts which act on the respective permanent magnets from the coils in certain positions when the permanent magnets are conveyed under a condition obtained by partially changing the condition shown in FIG. 20.

FIG. 23 is a diagram showing an example of a sample analysis system according to a seventh embodiment of the invention.

FIG. 24 is a diagram showing an example of a sample pretreatment device according to the seventh embodiment of the invention.

DESCRIPTION OF EMBODIMENTS

Hereinafter, embodiments of a conveying device, and a sample analysis system and a sample pretreatment device including the conveying device of the present invention will be described with reference to the drawings.

First Embodiment

A first embodiment of a conveying device and a method for conveying a conveyance object of the present invention will be described with reference to FIGS. 1 to 6.

First, a schematic configuration of the conveying device of the embodiment will be described with reference to FIG. 1. FIG. 1 is a diagram schematically showing an outline of the conveying device of the embodiment in which three magnetic poles 25 and a permanent magnet 10 operate relative to each other.

In FIG. 1, a conveying device 1 includes the permanent magnet 10, the magnetic pole 25 including a columnar core 22 and a winding 21 wound around an outer periphery of the core 22, a drive circuit 50, a current command calculation unit 55, a position and speed detection unit 60, and a weight detection unit 65.

The permanent magnet 10 is provided on a side of a conveyance object and is desirably formed of a permanent magnet such as neodymium, ferrite, or the like. However, the permanent magnet 10 can also be formed of another magnet and a soft magnetic body. The permanent magnet 10 and the soft magnetic body may be combined, or the permanent magnet 10 may be formed of a magnetic body instead of the permanent magnet.

As an example of the conveyance object in which the permanent magnet 10 is provided, there are a sample holder (not shown) and a sample rack (refer to FIG. 23) for storing a plurality of samples. In the sample holder and the sample rack, one sample container for storing the sample is normally mounted on the sample holder, and is conveyed up to a desired position as the permanent magnet 10 moves. That is, the sample container, the sample holder for holding the sample container, the sample rack, and the permanent magnet 10 are configured to be integrated, and by conveying the permanent magnet 10, the sample container is conveyed up to the desired position.

Normally, a conveying surface (not shown) for supporting the permanent magnet 10 is provided between the magnetic pole 25 and the permanent magnet 10, and the permanent magnet 10 slides and moves on the conveying surface.

As shown in FIG. 1, the conveying device 1 includes at least two or more magnetic poles 25. Each of the magnetic poles 25 includes the core 22 formed of the magnetic body and the winding 21 wound around the outer periphery of the core 22. The columnar core 22 of the magnetic poles 25 is disposed so as to face the permanent magnet 10. The permanent magnet 10 integrated with the conveyance object moves on the magnetic pole 25.

In the conveying device 1, an electromagnetic force acts on the permanent magnet 10 by allowing a current to flow through the winding 21, such that the permanent magnet 10 moves between the magnetic poles 25.

Here, in order to cause the electromagnetic force to efficiently act thereon and to cause the permanent magnet 10 to move in a target direction, relative position information between the permanent magnet 10 and the magnetic pole 25 is required.

For example, when the permanent magnet 10 is present directly above one of the two magnetic poles 25, no force is generated in a conveying direction even though the current is allowed to flow through the magnetic poles 25 provided directly below the permanent magnet 10. On the contrary, the current is allowed to flow through the magnetic pole 25 where the permanent magnet 10 is not present directly thereabove, thereby making it possible to generate a force for attracting the permanent magnet 10 to the magnetic pole 25. That is, it is possible to efficiently generate a force and control a direction of the force.

Therefore, in the conveying device 1 of the present invention, the position and speed detection unit 60 detects a position and speed of the permanent magnet 10. The position and speed detection unit 60 can have various configurations to obtain information for calculating the position and speed of the permanent magnet 10. For example, magnetism detection by a Hall element, a physical position sensor, or position recognition using an image, or the like can be used.

The Hall element can be used to detect magnetism of the permanent magnet 10, to calculate the speed of the permanent magnet 10 from the time required for movement of the permanent magnet 10 between the cores 22 formed of the second magnetic body, and to control the current.

The position and speed detection unit 60 can obtain the position of the permanent magnet 10 by detecting the current flowing through the winding 21 and a flow type thereof. This principle is described as follows.

The core 22 is formed of the magnetic body, and a magnetic flux flowing through the core 22 has a property that the magnetic flux becomes difficult to flow therethrough as the magnetic flux increases. Here, when a voltage is applied to the winding 21 to allow the current to flow therethrough, a magnetic flux generated by the current is generated in the core 22. Therefore, the magnetic flux generated by the permanent magnet 10 and the magnetic flux generated by the current flowing through the winding 21 are generated in the core 22.

Generally, when the current flows through the winding 21, a magnetic field is generated around the winding 21, and the generated magnetic flux is proportional to a value of the current flowing therethrough. This proportionality constant is referred to as inductance. However, in the circuit including the magnetic body such as the core 22 or the like, the inductance varies depending on a saturation characteristic of the core 22.

When the saturation of the core 22 occurs, the inductance varies depending on a magnitude of the magnetic flux generated in the core 22. That is, the inductance of the winding 21 varies depending on the magnitude of the magnetic flux of the permanent magnet 10. This indicates that the inductance of the winding 21 varies depending on the position of the permanent magnet 10.

A voltage V generated in the winding 21 is represented by a relationship described below.

$$V = -d\varphi/dt \quad (1)$$

Here, $\varphi$ is the magnetic flux and t is time. The voltage V is represented by an amount of change in magnetic flux per unit time.

When current I and inductance L are set, a relationship therebetween is established below.

$$dI/dt = (1/L) \times (d\varphi/dt) \quad (2)$$

From Equations (1) and (2), a relationship is established below.

$$dI/dt = -V/L \quad (3)$$

That is, when a constant voltage is applied to the winding 21, a time derivative of the supplied current I varies depending on a magnitude of the inductance L as shown in Equation (3). This indicates that the way the current to be supplied when the voltage is applied rises differently.

Therefore, when the voltage is applied to the winding 21, the inductance L can be calculated by detecting the current flowing through the winding 21 and the flow type thereof. That is, when the inductance L of the winding 21 that varies depending on the position of the permanent magnet 10 is detected, the position of the permanent magnet 10 that affects the inductance L thereof can be obtained.

The weight detection unit 65 that measures a weight of the conveyance object can be used to determine a value of a current to be applied from the weight of the conveyance object. The weight detection unit 65 can also estimate a deterioration state of a conveying surface side of the conveyance object, wear of the conveying surface, or the like based on weight information, a position of the conveyance object, and a speed thereof.

The weight detection unit 65 can be a scale that actually detects the weight of the conveyance object, a processing unit that obtains the weight by image-processing a captured image of the conveyance object, and a processing unit for obtaining an acceleration and a weight by using the position and speed information detected by the position and speed detection unit 60 described above, a magnetic flux strength, or the like.

The current command calculation unit 55 calculates the current flowing through each winding 21 by using the position information and the speed information of the permanent magnet 10 detected by the position and speed detection unit 60 and the weight information detected by the weight detection unit 65, and outputs a command signal to the drive circuit 50 connected to each winding 21. The drive circuit 50 supplies the current to the corresponding winding 21 based on the command signal.

The current command calculation unit 55 can be implemented by allowing a computer and a field-programmable gate array (FPGA) including a CPU, a memory, an interface, or the like to read a program and to execute a calculation. The program is stored in an internal recording medium and an external recording medium (not shown) in each configuration, and is read and executed by the CPU.

Operation control processing may be combined in one program, may be divided into a plurality of programs, or may be a combination thereof. A part or all of the programs may be implemented by dedicated hardware or may be modularized. Various programs may be installed in each device from a program distribution server, the internal recording medium, and the external recording medium.

Each device is not required to be independent, and two or more devices may be integrated and shared to perform only the processing. At least a part of the configuration can be connected via a wired or wireless network.

FIG. 2 is a schematic view of the conveying device 1 in which a total of 100 magnetic poles 25, which include 10 magnetic poles 25 in an X direction and 10 magnetic poles 25 in a Y direction, are disposed. By exciting the magnetic poles 25 around a periphery of the permanent magnet 10, the permanent magnet 10 can be conveyed in any direction.

A thrust generated by allowing the current to flow through the winding 21 of the magnetic pole 25 when the permanent magnet 10 is conveyed in the X direction will be described below with reference to FIG. 3 and the subsequent drawings.

FIG. 3 shows a schematic view cut along a conveying direction from a magnetic pole 25*a* to a magnetic pole 25*d* in four magnetic poles 25*a* to 25*d* when the permanent magnet 10 is conveyed in the X direction. FIG. 4 shows a thrust (a force in the X direction) acting on the permanent magnet 10 when a direct current is applied to a winding 21*c* and the permanent magnet 10 moves from a section A to a section A' in the X direction.

As shown in FIG. 4, the thrust when the winding 21*c* in a direction of moving the permanent magnet 10 is excited with a constant current value varies depending on the position of the permanent magnet 10. That is, when the permanent magnet 10 moves from the section A to the section A', and a constant current flows through the winding in a traveling direction, the thrust fluctuates depending on the position thereof, an acceleration acting on the permanent magnet 10 varies, and a speed fluctuates.

Therefore, when the constant current flows through the winding in the traveling direction, the speed of the conveyance object may vary, and a sample and a reagent may spill due to a fluctuation in speed. Due to the fluctuation in speed, a speed variation may occur between the plurality of conveyance objects, such that a conveying interval may not be narrowed.

FIG. 5 shows a relationship between a current applied to the winding 21 at positions a, b, and c in FIG. 4 and a thrust. As shown in FIG. 5, even when the current flows through the same winding 21, the relationship between the current and the thrust are different from each other depending on the position of the permanent magnet 10.

As described above, it can be seen that in order to keep the thrust acting on the permanent magnet 10 constant, it is required to vary the current flowing through the winding 21 depending on the position of the permanent magnet 10.

FIG. 6 shows an example of a value of a current for keeping the thrust constant at each position of the permanent magnet 10. As shown in FIG. 6, by varying the current depending on the position of the permanent magnet 10, a fluctuation in thrust acting on the conveyance object can be prevented, and vibration of the conveyance object and the speed variation thereof can be reduced. Instead of continuously and smoothly varying the current as shown in FIG. 6, the thrust can be adjusted by varying the current stepwise.

The weight of the conveyance object may vary depending on a type of a rack, a holder, or the like forming the conveyance object, a content and an amount of the sample container, or the like. In this case, when the conveyance object is driven by the constant current, that is, when the thrust is the same, a conveying speed of the conveyance object varies depending on a difference in weight. That is, when the conveyance objects having different weights exist on the same line, it is required to adjust the conveying speed to the conveyance object whose conveying speed is slow, such that there is room for further improvement in a conveying performance.

In this case as well, even though the current flowing through the winding 21 does not vary depending on the position of the permanent magnet 10 (even though the current flowing through the winding is constant), it is possible to eliminate a difference in speed caused by the difference in weight of the conveyance object by varying a magnitude of the current.

As described above, since the weight can be measured by the weight detection unit 65 that measures the weight of the conveyance object, the difference in speed can be eliminated by varying the current value depending on the weight or by controlling the current so that the speed becomes constant from the detected position and speed of the conveyance object.

When a frictional force increases due to deterioration in a contact surface with the conveying surface of the rack and the holder serving as the conveyance object or deterioration in the conveying surface, or a thrust against the current decreases due to deterioration in the magnet such as demagnetization or the like, the conveying speed may decrease. In this case as well, a degree of deterioration or the like is determined from the position and speed of the conveyance object, and a decrease in the conveying speed can be prevented more reliably by controlling the current value, thereby making it possible to maintain the conveying performance at a high level.

Next, an effect of the embodiment will be described.

The conveying device 1 of the first embodiment of the present invention described above includes: the permanent magnet 10 provided on a side of the sample rack 111; the magnetic pole 25 including the core 22 formed of the second magnetic body and the winding 21 wound around the outer periphery of the core 22; the drive circuit 50 that supplies a current to the winding 21 of the magnetic pole 25; and the current command calculation unit 55 that controls a value of a current to be supplied from the drive circuit 50 to the winding 21, in which the current command calculation unit 55 varies the current to be supplied to the winding 21.

As a result, it is possible to prevent occurrence of the variation in conveying performance caused by the difference in position, speed, and weight of the conveyance object, the degree of deterioration in the conveying surface, or the like as compared with the related art, thereby making it possible to cope with various conditions. Therefore, the embodiment can provide the conveying device and the method for conveying the conveyance object in which the variation in speed of the conveyance object can be prevented as compared with the related art, and the conveying performance can be maintained at a high level.

The conveying device 1 further includes the position and speed detection unit 60 that detects the position of the permanent magnet 10 or the speed thereof. Since the current command calculation unit 55 varies the current to be supplied to the winding 21 based on the information on the position or speed of the permanent magnet 10, which is detected by the position and speed detection unit 60, it is possible to reliably prevent the occurrence of the variation in conveying performance depending on the position and speed of the conveyance object as compared with the related art, such that the conveying performance can be maintained more reliably at a high level.

The conveying device 1 further includes the weight detection unit 65 that detects the weight of the sample rack 111. The current command calculation unit 55 varies the current to be supplied to the winding 21 based on the weight information of the sample rack 111 detected by the weight detection unit 65, such that it is possible to reliably prevent occurrence of the variation in conveying performance caused by the difference in weight of the conveyance object as compared with the related art, and thus the conveying performance can be maintained more reliably at a high level.

Second Embodiment

A conveying device and a method for conveying a conveyance object according to a second embodiment of the present invention will be described with reference to FIGS. 7 to 13. The same configuration as that of the first embodiment will be denoted by the same reference sign, and the description thereof will be omitted. The same also applies to the following embodiments.

First, a schematic configuration of the conveying device of the embodiment will be described with reference to FIG. 7. FIG. 7 is a diagram schematically showing an outline of the conveying device of the embodiment.

FIG. 7 shows a conveying device 1A in which two permanent magnets 10a and 10b, and four magnetic poles 25a, 25b, 25c, and 25d operate relative to each other. In the conveying device LA, magnetization directions 90 of the permanent magnets 10a and 10b are the same. Here, a pitch between the respective magnetic poles 25 is set to Pc, and a gap between the permanent magnet 10a and the permanent magnet 10b is set to Pm. In FIG. 7, Pc=Pm.

In FIG. 7, the permanent magnet 10a integrated with the conveyance object moves from a section A to a section A' in the X direction, and the permanent magnet 10b moves from the section A' to a section A" in the X direction by allowing a current of 1 [A] to flow through a winding 21b and a current of −1 [A] to flow through a winding 21c without changing a value of the current.

Under these conditions, a direction of a magnetic flux 80b generated by the winding 21b is an upper direction in FIG. 7, whereas a direction of a magnetic flux 80c generated by the winding 21c is a lower direction in FIG. 7. Thrusts acting on the permanent magnets 10a and 10b at this time are shown in FIG. 8. As shown in FIG. 8, superposition of the magnetic flux 80b and the magnetic flux 80c generates a positive thrust with respect to the permanent magnet 10a. On the other hand, a negative thrust (a force in the −X direction) is generated in the permanent magnet 10b. That is, it becomes difficult to convey the permanent magnets 10a and 10b side by side in the same direction.

Therefore, when a distance between the permanent magnets 10a and 10b is short, two permanent magnets are conveyed side by side by allowing different current values to flow through the windings 21b, 21c, and 21d of three continuous magnetic poles 25b, 25c, and 25d, and by applying a gradient to the magnetic flux contributing to the thrust. An example of such a pattern is shown in FIG. 9.

FIG. 9 shows an example in which a current of 1.5 [A] flows through the winding 21b, a current of 0.3 [A] flows through the winding 21c, and a current of −0.9 [A] flows through the winding 21d. In the same manner as that of FIG. 7, the permanent magnet 10a integrated with the conveyance object moves from the section A to the section A' in the X direction, and the permanent magnet 10b moves from the section A' to the section A" in the X direction without changing the value of the current to be supplied to each of the windings 21b, 21c, and 21d. Thrusts acting on the permanent magnets 10a and 10b at this time are shown in FIG. 10.

As shown in FIG. 10, by applying the gradient to the current value, both the thrust acting on the permanent magnet 10a and the thrust acting on the permanent magnet 10b, which are generated by superposition of the magnetic fluxes 80b, 80c, and 80d, can be in the same direction.

In the situation shown in FIG. 9, it is also possible to supply a current value having a greater positive value than that of the current value to be supplied to the winding 21b of the magnetic pole 25b to a winding 21a of the magnetic pole 25a.

Although the example of FIG. 9 shows a case in which the gradient of the current value linearly varies depending on the position of the magnetic pole 25, it is desirable that the gradient of the current value does not vary in positive and negative of the slope of the windings 21 that are continuously provided and adjacent to each other, and the gradient of the current value increases or decreases in the traveling direction of the sample rack 111. That is, it is desirable to perform control to cause all the current values to be different so that gradients of magnitudes of the magnetic fluxes contributing to the thrusts between two or more adjacent magnetic poles 25 have the same sign.

When the current is supplied without changing the positive or negative of the slope of the gradient, and the values of the currents to be supplied to the windings 21 adjacent to each other along the traveling direction of the sample rack 111 are caused to be different in positive and negative values, an absolute value of the current supplied thereto can be reduced, which is desirable from a point of view of energy efficiency and measures against heat generation.

The embodiment describes a case in which two permanent magnets are provided, and even though the number of permanent magnets is greater than two or more, in the magnetic poles generating thrusts therein, it is desirable that the gradients of the magnetic fluxes contributing to the thrusts generated by the currents flowing through the windings have the same sign.

FIG. 11 is an example of a flow type of a current in each winding when polarities of the permanent magnets 10a and 10b are reversed with respect to FIG. 9.

In FIG. 11, a current value of a winding far from each permanent magnet increases, a current value of a winding closer to each permanent magnet decreases, and the current is controlled so that the gradient of the change in magnetic flux contributing to the thrust at each position of the permanent magnet is one polarity (positive or negative).

FIG. 12 shows an example in which a current of 1.0 [A] flows through the winding 21a, the current of 1.0 [A] flows through the winding 21b, a current of −1.0 [A] flows through the winding 21c, and the current of −1.0 [A] flows through the winding 21d. In the same manner, FIG. 13 shows thrusts acting on the permanent magnets 10a and 10b when the permanent magnet 10a integrated with the conveyance object moves from the section A to the section A' in the X direction, and the permanent magnet 10b moves from the section A' to the section A" in the X direction without changing the current value of each winding.

As shown in FIG. 13, the permanent magnet 10a between the section A and the section A' is conveyed by positive thrusts generated by a magnetic flux 80a formed by the winding 21a reinforced by a core 22a, the magnetic flux 80b formed by the winding 21b reinforced by a core 22b, and the magnetic flux 80c formed by the winding 21c reinforced by a core 22c.

On the other hand, in the magnetic flux 80c formed by the winding 21c and the magnetic flux 80d formed by the winding 21d reinforced by the core 22d, which contribute to the thrusts, the gradients of the magnetic fluxes are symmetrical on the left and right, such that the thrust acting on the permanent magnet 10b in the section from the section A' to the section A" reverses a direction of the thrust with a center of the section almost from the section A' to the section A" as a boundary.

Therefore, it is difficult to convey the permanent magnet 10a provided in the section from the section A to the section A' and the permanent magnet 10b provided in the section from the section A' to the section A" in the same direction at the same speed. Accordingly, the current value flowing through the winding is controlled in the section where the permanent magnet is desired to be conveyed. Particularly, it can be seen that the direction of the thrust and the magnitude of the thrust can be controlled by controlling the gradient of the magnetic flux contributing to the thrust.

Other configurations and operations are substantially the same as those of the conveying device and the method for conveying the conveyance object according to the first embodiment described above, and details thereof will be omitted.

The conveying device and the method for conveying the conveyance object according to the second embodiment of the present invention can also obtain almost the same effect as that of the conveying device and the method for conveying the conveyance object according to the first embodiment described above.

The current command calculation unit 55 causes the values of the currents to be supplied to the windings 21 adjacent to each other along the traveling direction of the sample rack 111 to be different from each other, such that even when the conveyance objects are continuously provided, the conveyance objects can be efficiently conveyed in the same direction, and a high conveying performance can be maintained.

The current command calculation unit 55 causes the values of the currents to be supplied to the windings 21 adjacent to each other along the traveling direction of the sample rack 111 to be different from each other in positive and negative values, or the current command calculation unit 55 reverses the directions of the magnetic fluxes generated by the windings 21 adjacent to each other along the traveling direction of the sample rack 111, thereby making it possible to efficiently convey the conveyance objects in the same direction even when the conveyance objects are continuously provided, without increasing the supplied current value more than necessary.

When two or more of the magnetic poles 25 are provided and at least two of the sample racks 111 respectively provided with the permanent magnet 10 are provided, if the number of the sample racks is set to N, the current command calculation unit 55 causes all the values of the currents of N or more continuous windings 21 to be different from each other, such that even when the conveyance objects are continuously provided, the conveyance objects can be efficiently conveyed in the same direction and at almost same speed, and thus the high conveying performance can be maintained.

The current command calculation unit 55 causes the values of the currents of N or more continuous windings 21 to increase or decrease in the traveling direction of the sample rack 111, such that even when the conveyance objects are continuously provided, the conveyance objects can be efficiently conveyed in the same direction, and thus the high conveying performance can be maintained.

Third Embodiment

A conveying device and a method for conveying a conveyance object according to a third embodiment of the present invention will be described with reference to FIGS. 14 and 15.

First, a schematic configuration of the conveying device of the embodiment will be described with reference to FIG. 14. FIG. 14 is a diagram schematically showing an outline of a conveying device 1B of the embodiment.

The conveying device 1B shown in FIG. 14 shows an example in which a current of 1.0 [A] flows through the winding 21a, a current of −1.0 [A] flows through the winding 21b, the current of 1.0 [A] flows through the winding 21c, and the current of −1.0 [A] flows through the winding 21d. The magnetization directions 90 of the permanent magnets 10a and 10b are the same.

When a pitch between the magnetic poles 25 is set to Pc and a gap between the permanent magnet 10a and the permanent magnet 10b is set to Pm, 2Pc=Pm. In this manner, when the gap Pm between the permanent magnet 10a and the permanent magnet 10b satisfies the condition of 2Pc=Pm, as shown in FIG. 14, both the permanent magnet 10a and the permanent magnet 10b can have the magnetic fluxes, which are generated by the magnetic poles 25a and 25c respectively provided directly below the permanent magnet 10a and the permanent magnet 10b, directed in the same direction, and can also have the magnetic fluxes, which are generated by the magnetic poles 25b and 25d closest to each other in the traveling direction, directed in the same direction. This also applies when a condition of 2Pc<Pm is also satisfied.

That is, when conveyance is performed so as to satisfy a condition of 2Pc Pm, the conveyance can be efficiently performed by causing the magnetic fluxes contributing to the thrusts acting on the permanent magnet 10a and the permanent magnet 10b to be directed in the same direction, without controlling the gradient of the current to form one polarity (positive or negative).

When the polarities of the permanent magnet 10a and the permanent magnet 10b are opposite to each other, and the conveyance is performed so as to satisfy the condition of 2Pc Pm, the gradients of the values of the currents to be supplied to all the windings 21 are desirably controlled to form the same polarity.

When the gap Pm between the permanent magnets 10 satisfies the relationship of 2Pc>Pm, the gradients of the values of the current to be supplied to the windings 21 are desirably controlled not to form one polarity (positive or negative), but to be reversed at a certain part.

As a result, the permanent magnet 10a and the permanent magnet 10b can be simultaneously conveyed in the same direction. As described above, the currents flowing through the windings 21 of the magnetic poles 25 adjacent to each other are changed, thereby making it possible to efficiently move the conveyance object.

FIG. 15 shows a thrust acting on the permanent magnet 10a from a starting position A₀ to the section A when no current flows through each of the windings 21a, 21b, 21c, and 21d in FIG. 14. Even when no current flows through each winding, the permanent magnet 10a is attracted to the core 22a formed of the magnetic body. Therefore, a negative thrust is generated from the starting position A₀ to a ½ Pc section. That is, it is required to generate a positive thrust that overcomes the negative thrust in this region.

On the contrary, in from the starting position A₀ to the ½ Pc section or later, the permanent magnet 10a is attracted to core 22b and the positive thrust is generated. Therefore, smooth operation can be implemented by increasing the current value from the starting position A₀ to the ½ Pc section and by increasing the thrust.

To sum up, when the pitch of two or more cores 22 is set to Pc, the current value in the ½ Pc section is caused to be larger than the current value after ½ Pc, thereby making it possible to implement the smooth operation.

Other configurations and operations are substantially the same as those of the conveying device and the method for conveying the conveyance object according to the first embodiment described above, and details thereof will be omitted.

The conveying device and the method for conveying the conveyance object according to the third embodiment of the present invention can also obtain almost the same effect as that of the conveying device and the method for conveying the conveyance object according to the first embodiment described above.

When two or more magnetic poles 25 are provided and the pitch of the two or more cores 22 is set to Pc, the current value in the ½ Pc section is larger than the current value after ½ Pc, thereby making it possible to smoothly convey the conveyance object, and to further improve the conveying performance.

Fourth Embodiment

A conveying device and a method for conveying a conveyance object according to a fourth embodiment of the present invention will be described with reference to FIGS. 16 and 17.

First, a schematic configuration of the conveying device of the embodiment will be described with reference to FIG. 16. FIG. 16 is a diagram schematically showing an outline of a conveying device 1C of the embodiment.

In FIG. 16, a current of 1.0 [A] flows through the winding 21b and a current of −1.0 [A] flows through the winding 21c. The magnetization direction 90 of the permanent magnet 10a and a magnetization direction 91 of the permanent magnet 10b are opposite to each other.

FIG. 17 shows a thrust when current values different in positive and negative flow through the windings 21b and 21c adjacent to each other and the magnetization directions of the permanent magnet 10a and the permanent magnet 10b are reversed in the conveying device 1C. FIG. 17 shows a case in which the permanent magnet 10a integrated with the conveyance object moves from the section A to the section A' in the X direction, and the permanent magnet 10b moves from the section A' to the section A" in the X direction, without changing the current value of each winding.

As shown in FIG. 17, it can be seen that the thrusts acting on the respective permanent magnets 10a and 10b at this time are generated in almost the same direction, and the conveyance object can be efficiently moved.

Other configurations and operations are substantially the same as those of the conveying device and the method for conveying the conveyance object according to the first embodiment described above, and details thereof will be omitted.

The conveying device and the method for conveying the conveyance object according to the fourth embodiment of the present invention can also obtain almost the same effect as that of the conveying device and the method for conveying the conveyance object according to the first embodiment described above.

Fifth Embodiment

A conveying device and a method for conveying a conveyance object according to a fifth embodiment of the present invention will be described with reference to FIGS. 18 and 19.

First, a schematic configuration of the conveying device of the embodiment will be described with reference to FIG. 18. FIG. 18 is a diagram schematically showing an outline of a conveying device 1D of the embodiment.

FIG. 18 shows an example in which a current of 1.0 [A] flows through the winding 21b and a current of −1.0 [A] flows through the winding 21c. FIG. 19 shows a thrust (a) when the current of 1.0 [A] flows through the winding 21b, a thrust (b) when the current of −1.0 [A] flows through the winding 21c, a thrust (c) when the current of 1.0 [A] flows through the winding 21b and the current of −1.0 [A] flows through the winding 21c, and a thrust (d) when no current flows through any of the windings. The thrusts shown in FIG. 19 are thrusts acting on the permanent magnet 10a in the section from the section A to the section A'.

As shown in FIG. 19, the thrust (a) when the current of 1.0 [A] flows through the winding 21b becomes large in the first half of the position (a side closer to the section A). The thrust (b) when the current of 1.0 [A] flows through the winding 21c becomes large in the second half of the position (a side closer to the section A').

The thrust (c) when the current of 1.0 [A] flows through the winding 21b and the current of −1.0 [A] flows through the winding 21c becomes approximately a target thrust waveform in the first half of the position (the side closer to the section A) and the second half of the position (the side closer to the section A'), thereby making it possible to stably generate the thrust in the section from the section A to the section A'.

As described above, the currents having different values flow through the windings adjacent to each other, thereby making it possible not only to increase the thrust but also to reduce the fluctuation in thrust.

Other configurations and operations are substantially the same as those of the conveying device and the method for conveying the conveyance object according to the first embodiment described above, and details thereof will be omitted.

The conveying device and the method for conveying the conveyance object according to the fifth embodiment of the present invention can also obtain almost the same effect as that of the conveying device and the method for conveying the conveyance object according to the first embodiment described above.

Sixth Embodiment

A conveying device and a method for conveying a conveyance object according to a sixth embodiment of the present invention will be described with reference to FIGS. 20 to 22.

First, a schematic configuration of the conveying device of the embodiment will be described with reference to FIG. 20. FIG. 20 is a diagram schematically showing an outline of a conveying device 1E of the embodiment.

In FIG. 20, a current of 1.0 [A] flows through the winding 21b, a current of −1.0 [A] flows through the winding 21c, and the current of 1.0 [A] flows through the winding 21d. The magnetization direction 90 of the permanent magnet 10a and the magnetization direction 91 of the permanent magnet 10b are opposite to each other.

Thrusts acting on the permanent magnets 10a and 10b under the conditions of FIG. 20 are shown in FIG. 21. In FIG. 21, the permanent magnet 10a integrated with the conveyance object moves from the section A to the section A' in the X direction without changing the current value of each winding. The permanent magnet 10b moves from the section A' to the section A" in the X direction.

As shown in FIG. 21, the thrusts acting on the respective permanent magnets at this time are generated in almost the same direction, such that the conveyance object can be efficiently moved. At this time, it can be seen that the thrusts acting on the permanent magnet 10a and the permanent magnet 10b are almost the same, such that the permanent magnet 10a and the permanent magnet 10b can move in the same direction at the same speed.

As an application example, FIG. 22 shows a thrust in which a current of 0 [A] (no current) flows through the winding 21b, a current of −1.0 [A] flows through the winding 21c, and a current of 1.0 [A] flows through the winding 21d. When the permanent magnet 10a and the permanent magnet 10b are operated in the same direction and at the same speed, the leading permanent magnet 10b is continuously conveyed as it is, and when the permanent magnet 10a is to be stopped or a speed thereof is to be reduced, the thrust can be reduced by the positive thrust.

It can be seen that the fluctuation in thrust can be prevented by continuously adjusting the current value to be supplied to a lower side of the permanent magnet conveyed in this manner and the winding of a front side of the leading permanent magnet.

Other configurations and operations are substantially the same as those of the conveying device and the method for conveying the conveyance object according to the first embodiment described above, and details thereof will be omitted.

The conveying device and the method for conveying the conveyance object according to the sixth embodiment of the present invention can also obtain almost the same effect as that of the conveying device and the method for conveying the conveyance object according to the first embodiment described above.

Seventh Embodiment

Embodiments of a sample analysis system and a sample pretreatment device to which the conveying device and the method for conveying the conveyance object are desirably applied according to a seventh embodiment of the present invention will be described with reference to FIGS. 23 and 24. First, an overall configuration of a sample analysis system 100 will be described with reference to FIG. 23. FIG. 24 is a diagram schematically showing the overall configuration of the sample analysis system 100.

In FIG. 23, the sample analysis system 100 is a device that respectively dispenses a sample and a reagent into a reaction container, reacts the dispensed sample and reagent, and measures the reacted liquid, and includes a conveying unit 101, an emergency rack input port 113, a conveying line 102, a buffer 104, an analysis unit 105, a storage unit 103, a display unit 118, a control unit 120, or the like.

The conveying unit 101 is a place where the sample rack 111, in which a plurality of sample containers 122 for storing biological samples such as blood, urine, or the like are stored, is installed. The emergency rack input port 113 is a place for inputting a sample rack (calibration rack) on which a standard liquid is loaded and the sample rack 111, in which the sample container 122 for storing the sample required for urgent analysis is stored, into the device.

The buffer 104 stores a plurality of sample racks 111 conveyed by the conveying line 102 so that dispensing order of the samples in the sample rack 111 can be changed.

The analysis unit 105 analyzes the sample conveyed from the buffer 104 via a conveyor line 106. Details thereof will be described later.

The storage unit 103 stores the sample rack 111 in which the sample container 122 for storing the sample whose analysis is completed by the analysis unit 105 is stored.

The conveying line 102 is a line for conveying the sample rack 111 installed in the conveying unit 101, and has the same configuration as that of any one of the conveying devices described in the first to sixth embodiments. In the embodiment, the magnetic body, desirably the permanent magnet, is provided on a back surface side of the sample rack 111.

The analysis unit 105 includes the conveyor line 106, a reaction disk 108, a sample dispensing nozzle 107, a reagent disk 110, a reagent dispensing nozzle 109, a cleaning mechanism 112, a reagent tray 114, a reagent ID reader 115, a reagent loader 116, and a spectrophotometer 121.

The conveyor line 106 is a line for carrying the sample rack 111 in the buffer 104 into the analysis unit 105, and has the same configuration as that of the conveying device described in the first and sixth embodiments.

The reaction disk 108 includes a plurality of reaction containers. The sample dispensing nozzle 107 dispenses the sample from the sample container 122 to the reaction container of the reaction disk 108 by rotational drive or vertical drive. A plurality of reagents are provided on the reagent disk 110. The reagent dispensing nozzle 109 dispenses the reagent from a reagent bottle in the reagent disk 110 into the reaction container of the reaction disk 108. The cleaning mechanism 112 cleans the reaction container of the reaction disk 108. The spectrophotometer 121 measures absorbance of a reaction liquid by measuring transmitted light obtained from a light source (not shown) through the reaction liquid of the reaction container.

The reagent tray 114 is a member for installing the reagent when the reagent is registered in the sample analysis system 100. The reagent ID reader 115 is a device for acquiring reagent information by reading a reagent ID attached to the reagent installed in the reagent tray 114. The reagent loader 116 is a device that carries the reagent into the reagent disk 110.

The display unit 118 is a display device for displaying an analysis result of concentration of a predetermined component in a liquid sample such as blood, urine, or the like.

The control unit 120 is formed of a computer or the like, controls an operation of each mechanism in the sample analysis system 100, and performs calculation processing for obtaining the concentration of the predetermined component in the sample such as blood, urine, or the like.

Hereinabove, the overall configuration of the sample analysis system 100 is described.

Sample analysis processing by the sample analysis system 100 as described above is generally performed in the following order.

First, the sample rack 111 is installed in the conveying unit 101 or the emergency rack input port 113, and is carried into the buffer 104 that can be randomly accessed by the conveying line 102.

The sample analysis system 100 carries the sample rack 111 having the highest priority order among the racks stored in the buffer 104 into the analysis unit 105 by the conveyor line 106 according to a rule of the priority order.

The sample rack 111 arriving at the analysis unit 105 is further conveyed by the conveyor line 106 up to a sample fractionation position near the reaction disk 108. The sample is fractionated in the reaction container of the reaction disk 108 by the sample dispensing nozzle 107. The sample dispensing nozzle 107 performs the fractionation of the sample as many times as necessary according to an analysis item requested for the sample.

The sample dispensing nozzle 107 performs the fractionation of the sample with respect to all the sample containers 122 mounted on the sample rack 111. The sample rack 111 whose fractionation processing with respect to all the sample containers 122 is completed is conveyed to the buffer 104 again. The sample rack 111 whose all sample fractionation processing including automatic re-examination is completed is conveyed to the storage unit 103 by the conveyor line 106 and the conveying line 102.

The reagent to be used for the analysis is fractionated from the reagent bottle on the reagent disk 110 with respect to the reaction container in which the sample is previously fractionated by the reagent dispensing nozzle 109. Next, a stirring mechanism (not shown) is used to stir a mixed liquid of the sample and the reagent in the reaction container.

Next, the light generated from the light source is transmitted through the reaction container containing the mixed liquid after stirring, and luminosity of the transmitted light is measured by the spectrophotometer 121. The luminosity measured by the spectrophotometer 121 is transmitted to the control unit 120 via an A/D converter and an interface. Next, the control unit 120 performs the calculation to obtain the concentration of the predetermined component in the liquid sample such as blood, urine, or the like, and a result of the concentration is displayed on the display unit 118 or the like, or stored in a storage unit (not shown).

As shown in FIG. 23, the sample analysis system 100 is not required to include all the above-described configurations, and a unit for pretreatment can be appropriately added, or some units or some configurations can be deleted. The analysis unit 105 is not limited to biochemical analysis, and may be used for immunoassay. The analysis unit 105 is not required to be one and two or more of the analysis unit 105 may be provided. In this case as well, the analysis unit 105 and the conveying unit 101 are connected to each other by the conveying line 102, and the sample rack 111 is conveyed from the conveying unit 101.

Next, an overall configuration of a sample pretreatment device 150 will be described with reference to FIG. 24. FIG. 24 is a diagram schematically illustrating the overall configuration of the sample pretreatment device 150.

In FIG. 24, the sample pretreatment device 150 is a device that executes various pretreatments necessary for the sample analysis. From the left side to the right side in FIG. 24, the sample pretreatment device 150 includes: a plurality of units including, as basic elements, a plugging unit 152, a sample storage unit 153, an empty holder stacker 154, a sample input unit 155, a centrifugation unit 156, a liquid quantity measuring unit 157, a unplugging unit 158, a child sample container preparation unit 159, a dispensing unit 165, and a transfer unit 161; a conveying device 170; and a control unit PC 163 that controls operations of the plurality of units.

As a conveying destination of the sample processed by the sample pretreatment device 150, the sample analysis system 100 for performing qualitative and quantitative analysis of the component of the sample is connected.

The sample input unit 155 is a unit for inputting the sample container 122 storing the sample into the sample pretreatment device 150. The centrifugation unit 156 is a unit for centrifuging the inputted sample container 122. The liquid quantity measuring unit 157 is a unit for measuring a liquid quantity of the sample stored in the sample container 122. The unplugging unit 158 is a unit for unplugging a stopper of the inputted sample container 122. The child sample container preparation unit 159 is a unit that performs a necessary preparation for dispensing the sample stored in the inputted sample container 122 into the next dispensing unit 165. The dispensing unit 165 is a unit for performing subdivision of the centrifuged sample for analyzing the centrifuged sample by the sample analysis system or the like, and for attaching a barcode or the like to the subdivided sample container 122 and child sample container 122. The transfer unit 161 is a unit for classifying the dispensed child sample container 122, and for performing preparation for transfer to the sample analysis system. The plugging unit 152 is a unit for plugging the stopper on the sample container 122 and the child sample container 122. The sample storage unit 153 is a unit for storing the closed sample container 122.

The conveying device 170 is a mechanism for conveying the sample holder and the sample rack that store the sample container 122 between the respective units and between the sample pretreatment device 150 and the sample analysis system 100, and uses any one of the conveying devices 1 according to the first and sixth embodiments.

The sample pretreatment device 150 is not required to include all the above-described configurations, and a unit can be further added, or some units or some configurations can be deleted.

The sample analysis system of the embodiment may be the sample analysis system 200 including the sample pretreatment device 150 and the sample analysis system 100 as shown in FIG. 24. In this case, the sample container 122 can be conveyed not only within the respective systems but also between the systems by connection with the conveying device 1 or the like of the first to sixth embodiments.

The sample analysis systems 100 and 200 and the sample pretreatment device 150 according to the seventh embodiment of the present invention include the conveying device of the first embodiment or the like, such that the sample container 122 can be conveyed to the conveying destination with high efficiency, and the time until the analysis result can be obtained can be shortened. Conveying troubles can be reduced, and a burden on an inspection technician can be reduced.

The seventh embodiment shows a case in which the sample rack 111 that stores five sample containers 122 where the sample is stored is conveyed as a conveying target. In addition to the sample rack 111 that stores five sample containers 122, a sample holder that holds one sample container 122 can be conveyed as the conveying target.

Others

The present invention is not limited to the embodiments, and includes various modifications. The embodiments are described in detail in order to describe the present invention in an easy-to-understand manner, and are not necessarily limited to those including all the described configurations.

It is also possible to replace a part of the configuration of one embodiment with a configuration of another embodiment, and it is also possible to add the configuration of another embodiment to the configuration of one embodiment. Another configuration can also be added, deleted, and replaced, with respect to a part of the configuration of each embodiment.

For example, while the first to seventh embodiments describe a case in which a conveyance object is a sample rack or the like, the conveyance object is not limited to the sample rack or the like, and various objects that are required to be conveyed on a large scale can be a conveying target.

REFERENCE SIGNS LIST 1, 1A, 1B, 1C, 1D, 1E . . . conveying device
10, 10a, 10b . . . permanent magnet (first magnetic body)
21, 21a, 21b, 21c, 21d . . . winding
22, 22a, 22b, 22c, 22d . . . core (second magnetic body)
25, 25a, 25b, 25c, 25d . . . magnetic pole (magnetic circuit)
50 . . . drive circuit
55 . . . current command calculation unit (calculation unit)
60 . . . position and speed detection unit (conveyance object detection unit)
65 . . . weight detection unit
80a, 80b, 80c, 80d . . . magnetic flux
90, 91 . . . magnetization direction
100 . . . sample analysis system
101 . . . conveying unit
102 . . . conveying line
103 . . . storage unit
104 . . . buffer
105 . . . analysis unit
106 . . . conveyor line
107 . . . sample dispensing nozzle
108 . . . reaction disk
109 . . . reagent dispensing nozzle
110 . . . reagent disk
111 . . . sample rack
112 . . . cleaning mechanism
113 . . . emergency rack input port
114 . . . reagent tray
115 . . . reader
116 . . . reagent loader
118 . . . display unit
120 . . . control unit
121 . . . spectrophotometer
122 . . . sample container
122 . . . child sample container
150 . . . sample pretreatment device
152 . . . plugging unit
153 . . . sample storage unit
154 . . . holder stacker
155 . . . sample input unit
156 . . . centrifugation unit
157 . . . liquid quantity measuring unit
158 . . . unplugging unit
159 . . . child sample container preparation unit
161 . . . transfer unit
165 . . . dispensing unit
170 . . . conveying device
200 . . . sample analysis system

The invention claimed is:

1. A conveying device, comprising:
a first magnetic body which is provided on a side of a conveyance object;
two or more magnetic circuits which each include a core made of a second magnetic body and a winding wound on an outer periphery of the core;
a drive circuit which supplies a current to the winding of the magnetic circuit;
a calculation unit which controls a value of the current to be supplied from the drive circuit to the winding; and
a conveyance object detection unit which detects a position or speed of the first magnetic body, wherein
the calculation unit makes the values of currents to be supplied to the respective windings adjacent to each other along a traveling direction of the conveyance object, different from each other in positive and negative, makes the current to be supplied to the winding vary based on information on the position or speed of the first magnetic body which is detected by the conveyance object detection unit, and makes, when a pitch of two or more of the cores is set to Pc, a current value in a ½ Pc section larger than a current value after ½ Pc.

2. The conveying device according to claim 1, further comprising:
a weight detection unit which detects weight of the conveyance object, wherein the calculation unit makes the current to be supplied to the winding vary based on weight information of the conveyance object which is detected by the weight detection unit.

3. The conveying device according to claim 1, wherein the calculation unit makes directions of magnetic fluxes generated by the respective windings adjacent to each other along the traveling direction of the conveyance object, opposite to each other.

4. The conveying device according to claim 1, wherein when two or more of the magnetic circuits are provided, and
at least two of the conveyance objects each provided with the first magnetic body are provided,
the calculation unit makes, when the number of the conveyance objects is set to N, values of currents of N or more continuous windings different one another.

5. The conveying device according to claim 4, wherein the calculation unit makes the values of the currents of the N or more continuous windings increase or decrease in the traveling direction of the conveyance object.

6. The conveying device according to claim 1, wherein when a pitch of two or more of the cores is set to Pc, and a gap Pm between two or more of the first magnetic bodies satisfies a relationship of $2Pc \leq Pm$, a polarity of the first magnetic body is the same.

7. The conveying device according to claim 1, wherein the first magnetic body is a permanent magnet.

8. A sample analysis system, comprising:
the conveying device according to claim 1.

9. A sample pretreatment device, comprising:
the conveying device according to claim 1.

10. A method for conveying a conveyance object, the conveyance object including a magnetic body, the method comprising:

a conveying step of applying a thrust to a first magnetic body provided on a side of the conveyance object by supplying a current to two or more magnetic circuits each including: i) a core made of a second magnetic body and ii) a winding wound around an outer periphery of the core, to excite the core; and a conveyance object detection step of detecting a position or speed of the conveyance object, wherein in the conveying step, values of currents to be supplied to the respective windings adjacent to each other along a traveling direction of the conveyance object are different from each other in positive and negative, the current to be supplied to the winding varies based on information on the position or speed of the first magnetic body which is detected in the conveyance object detection step, and, when a pitch of two or more of the cores is set to Pc, a current value in a ½ Pc section is larger than a current value after ½ Pc.

11. The method for conveying the conveyance object according to claim 10, further comprising:
a weight detection step of detecting weight of the conveyance object, wherein
in the conveying step, the current to be supplied to the winding varies based on information on the weight of the conveyance object which is detected in the weight detection step.

12. The method for conveying the conveyance object according to claim 10, wherein
when two or more of the magnetic circuits and at least two conveyance objects each provided with the first magnetic body are provided,
in the conveying step, when the number of the conveyance objects is set to N, values of currents of N or more continuous windings are different one another.

* * * * *